US012581544B2

(12) United States Patent
Chisci et al.

(10) Patent No.: US 12,581,544 B2
(45) Date of Patent: Mar. 17, 2026

(54) BANDWIDTH FOR CHANNEL OCCUPANCY TIME SHARING

(71) Applicant: QUALCOMM Incorporated, San Diego, CA (US)

(72) Inventors: Giovanni Chisci, San Diego, CA (US); Jing Sun, San Diego, CA (US); Arumugam Chendamarai Kannan, San Diego, CA (US); Vinay Chande, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 17/740,063

(22) Filed: May 9, 2022

(65) Prior Publication Data

US 2022/0377754 A1     Nov. 24, 2022

Related U.S. Application Data

(60) Provisional application No. 63/190,735, filed on May 19, 2021.

(51) Int. Cl.
| | |
|---|---|
| *H04W 48/08* | (2009.01) |
| *H04W 48/16* | (2009.01) |
| *H04W 72/0446* | (2023.01) |
| *H04W 72/0453* | (2023.01) |
| *H04W 72/1263* | (2023.01) |
| *H04W 72/23* | (2023.01) |
| *H04W 74/00* | (2009.01) |
| *H04W 74/02* | (2009.01) |

(Continued)

(52) U.S. Cl.
CPC ....... *H04W 74/0866* (2013.01); *H04W 48/08* (2013.01); *H04W 48/16* (2013.01); *H04W 72/0446* (2013.01); *H04W 72/0453* (2013.01); *H04W 72/1263* (2013.01); *H04W 72/23* (2023.01); *H04W 74/002* (2013.01); *H04W 74/02* (2013.01); *H04W 74/0816* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC .... H04L 5/0001–26; H04W 28/02–26; H04W 48/02–20; H04W 72/02–569; H04W 74/002–0891; H04W 84/005–22; H04W 88/02–12; H04W 92/02–24
See application file for complete search history.

(56) References Cited

U.S. PATENT DOCUMENTS

| | | | | |
|---|---|---|---|---|
| 2021/0092763 A1* | 3/2021 | Li | ............... | H04W 72/23 |
| 2023/0224891 A1* | 7/2023 | Noh | ............... | H04W 72/232 |
| 2023/0309117 A1* | 9/2023 | Sun | ............... | H04W 72/25 |

\* cited by examiner

*Primary Examiner* — Timothy J Weidner
(74) *Attorney, Agent, or Firm* — Loza & Loza, LLP

(57)     ABSTRACT

Aspects relate to the amount of shared bandwidth to be used for channel occupancy time (COT) sharing. An initiator device may use a clear channel assessment procedure to gain access to wireless communication resources for a COT that will be shared between the initiator device and a responder device. In some examples, the responder device may determine the shared bandwidth based on information that is implicit in a transmission from the initiator device. For example, the responder device may determine the shared bandwidth based at least in part on a bandwidth of a transmission from the initiator device.

27 Claims, 25 Drawing Sheets

(51) Int. Cl.

| | | |
|---|---|---|
| *H04W 74/08* | (2024.01) |
| *H04W 74/0816* | (2024.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

402
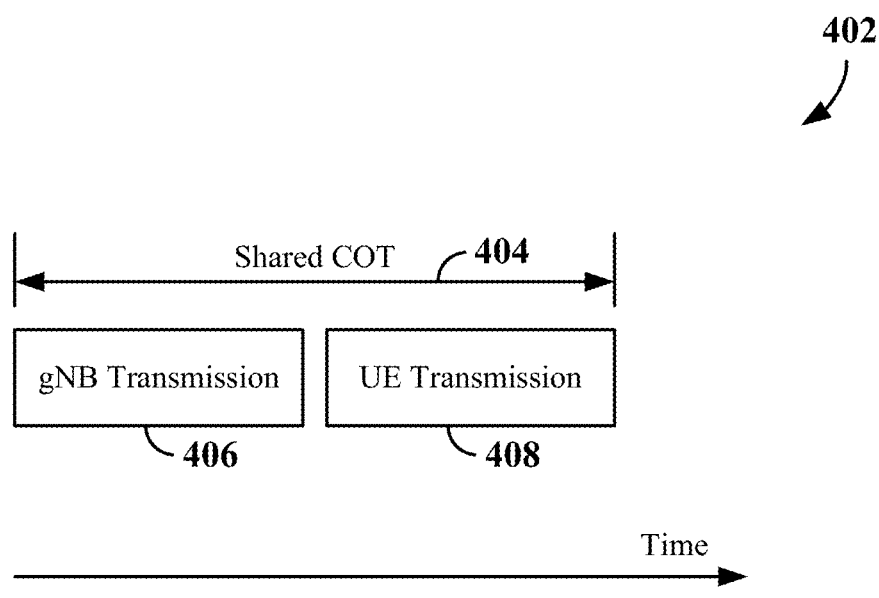
412
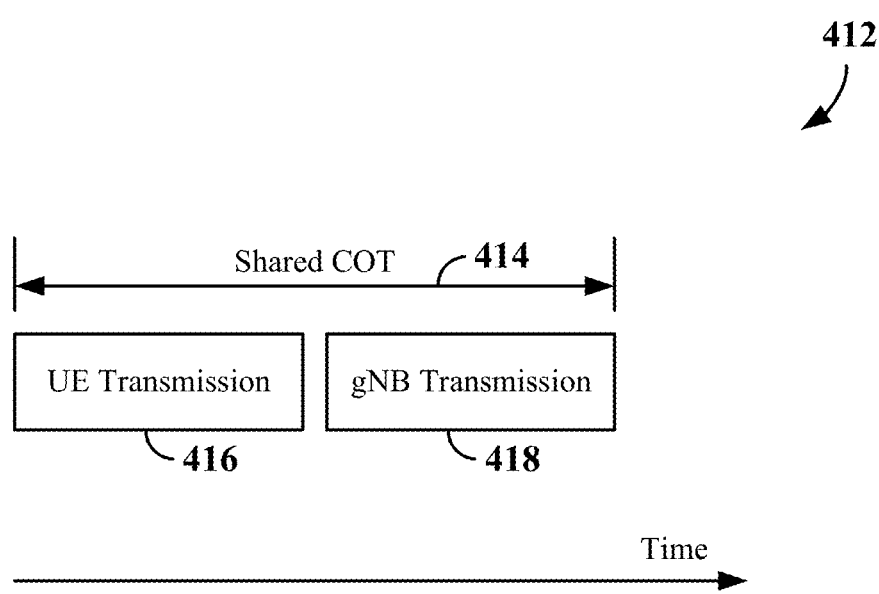
FIG. 4

FIG. 6

702
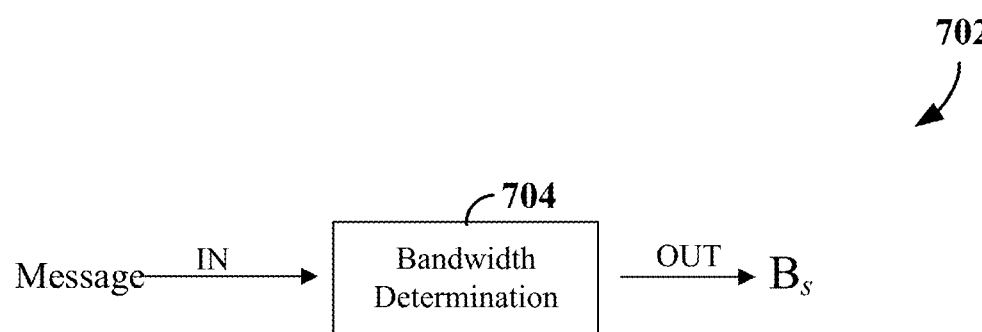
706
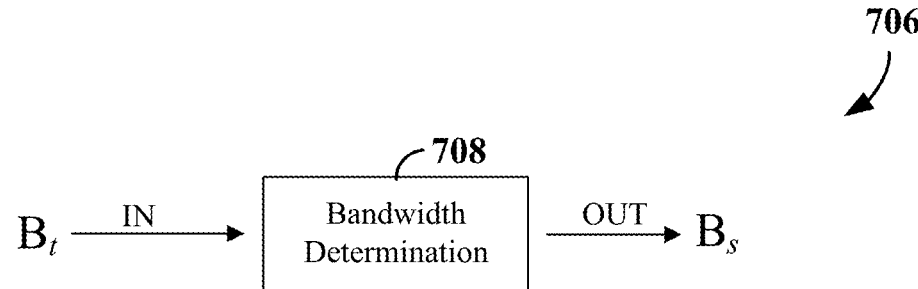
FIG. 7

1300

1600

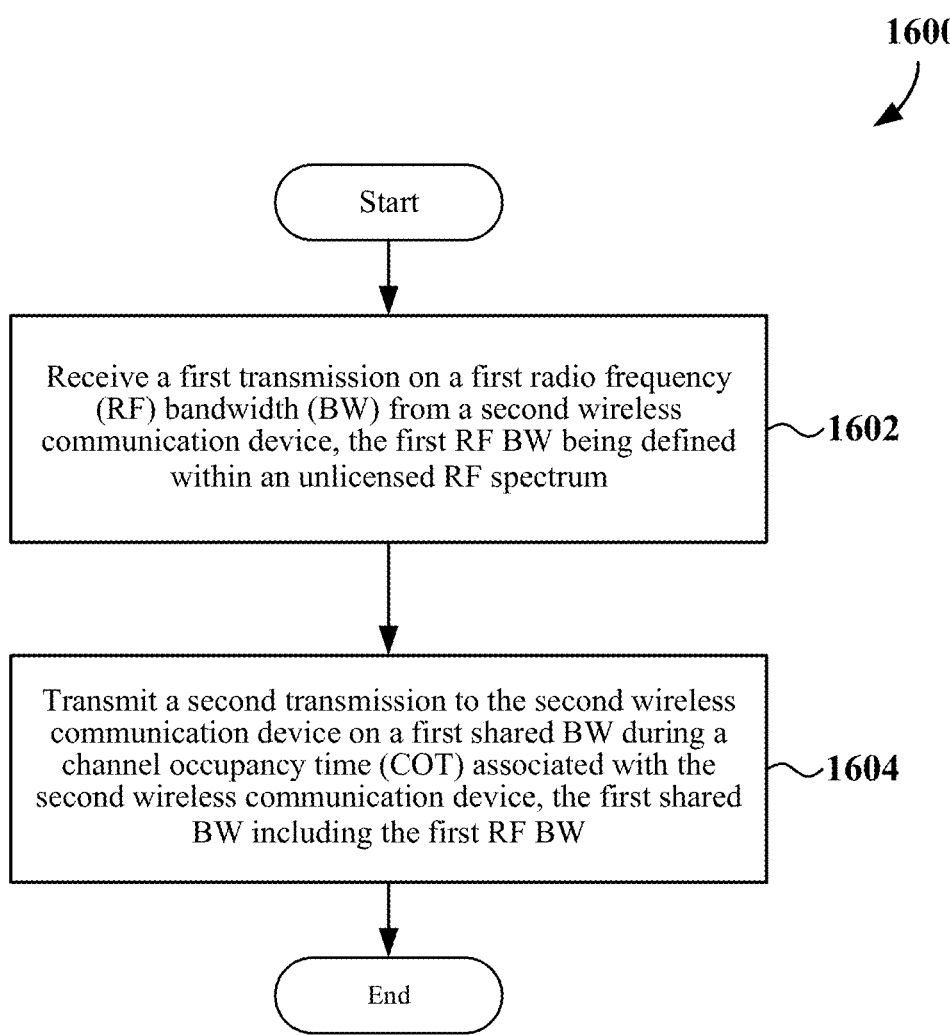

Start

Receive a first transmission on a first radio frequency (RF) bandwidth (BW) from a second wireless communication device, the first RF BW being defined within an unlicensed RF spectrum

1602

Transmit a second transmission to the second wireless communication device on a first shared BW during a channel occupancy time (COT) associated with the second wireless communication device, the first shared BW including the first RF BW

1604

End

FIG. 16

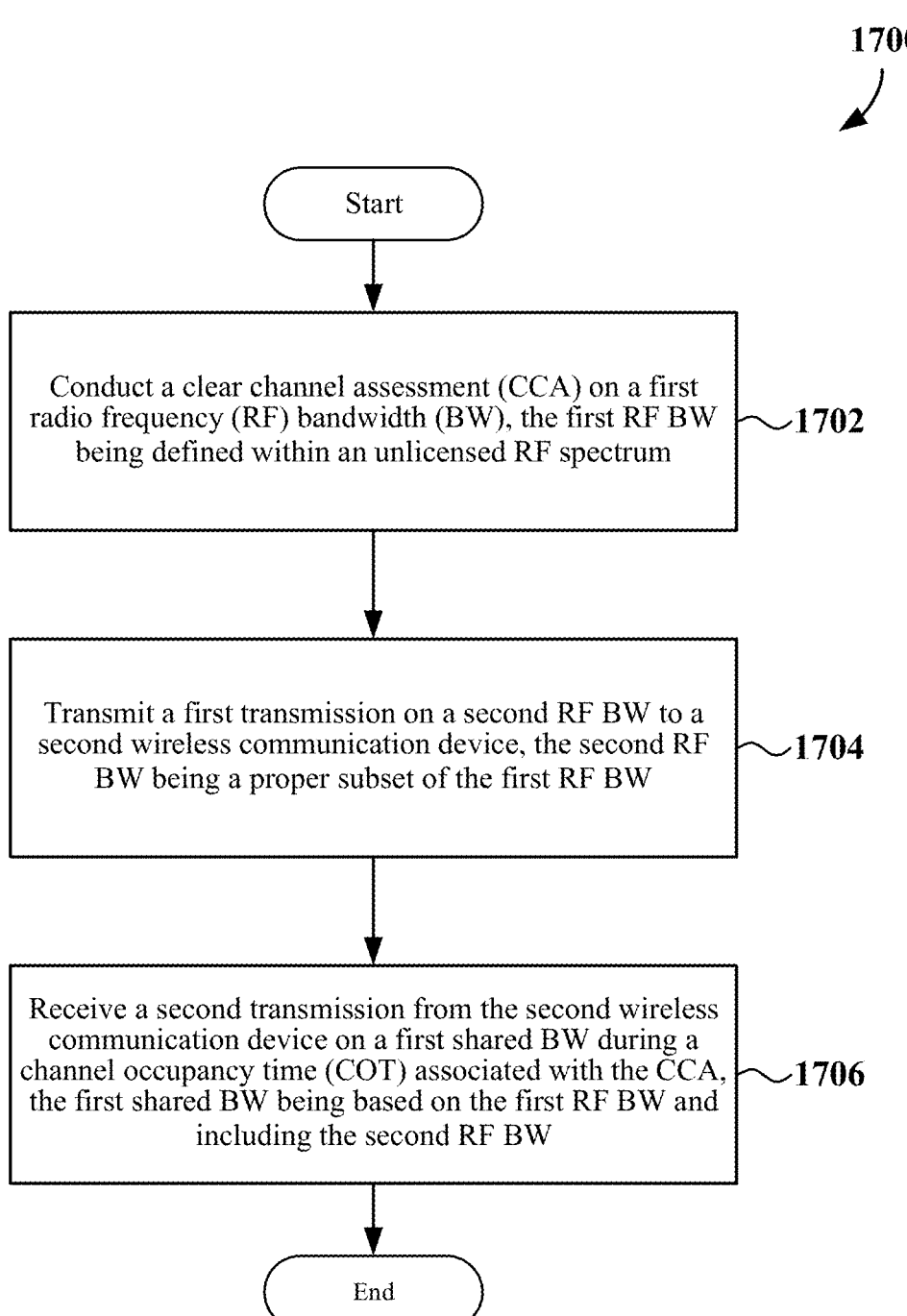

1700

Start

Conduct a clear channel assessment (CCA) on a first radio frequency (RF) bandwidth (BW), the first RF BW being defined within an unlicensed RF spectrum ⟶ 1702

Transmit a first transmission on a second RF BW to a second wireless communication device, the second RF BW being a proper subset of the first RF BW ⟶ 1704

Receive a second transmission from the second wireless communication device on a first shared BW during a channel occupancy time (COT) associated with the CCA, the first shared BW being based on the first RF BW and including the second RF BW ⟶ 1706

End

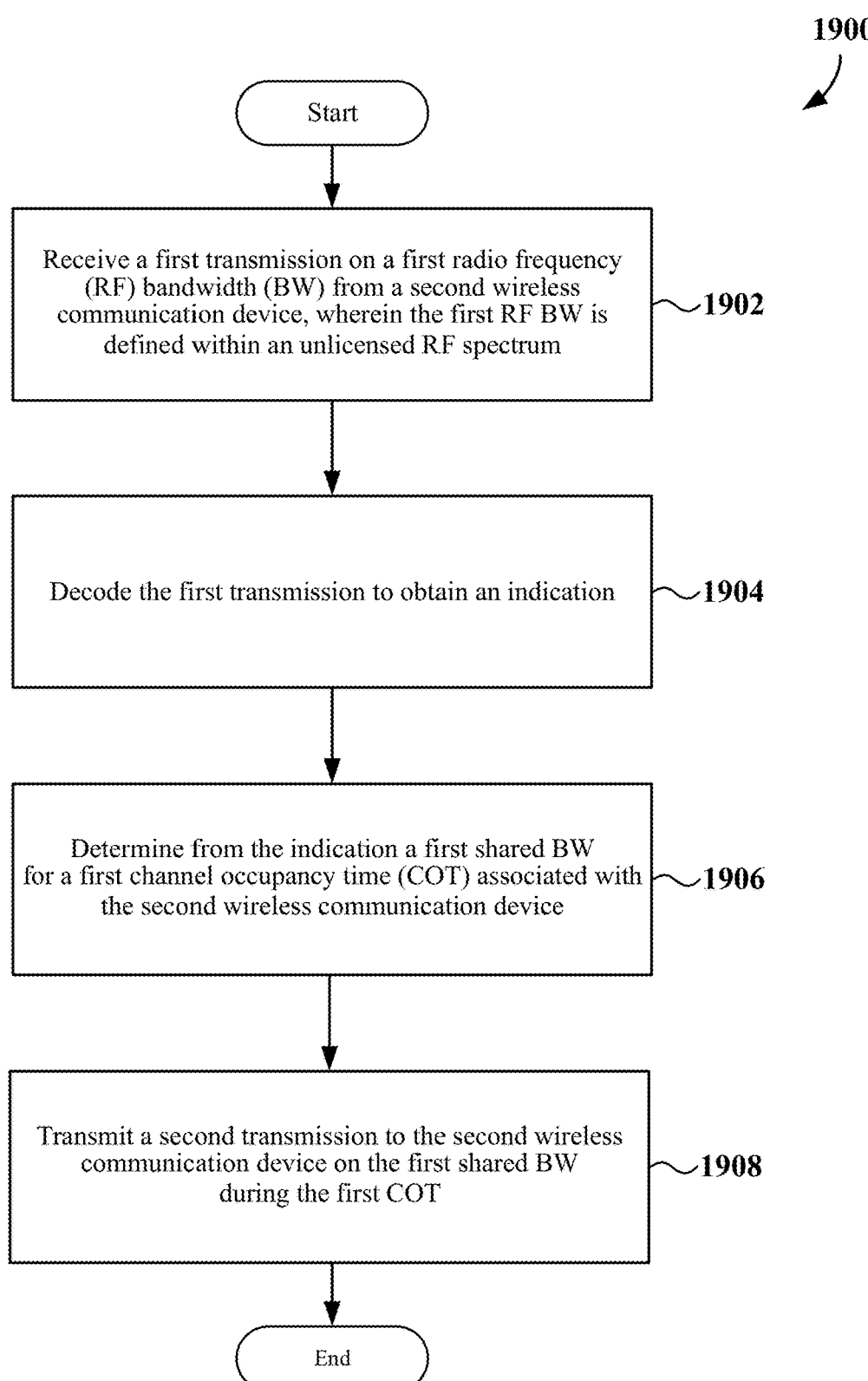

1900

Start

Receive a first transmission on a first radio frequency (RF) bandwidth (BW) from a second wireless communication device, wherein the first RF BW is defined within an unlicensed RF spectrum ～1902

Decode the first transmission to obtain an indication ～1904

Determine from the indication a first shared BW for a first channel occupancy time (COT) associated with the second wireless communication device ～1906

Transmit a second transmission to the second wireless communication device on the first shared BW during the first COT ～1908

End

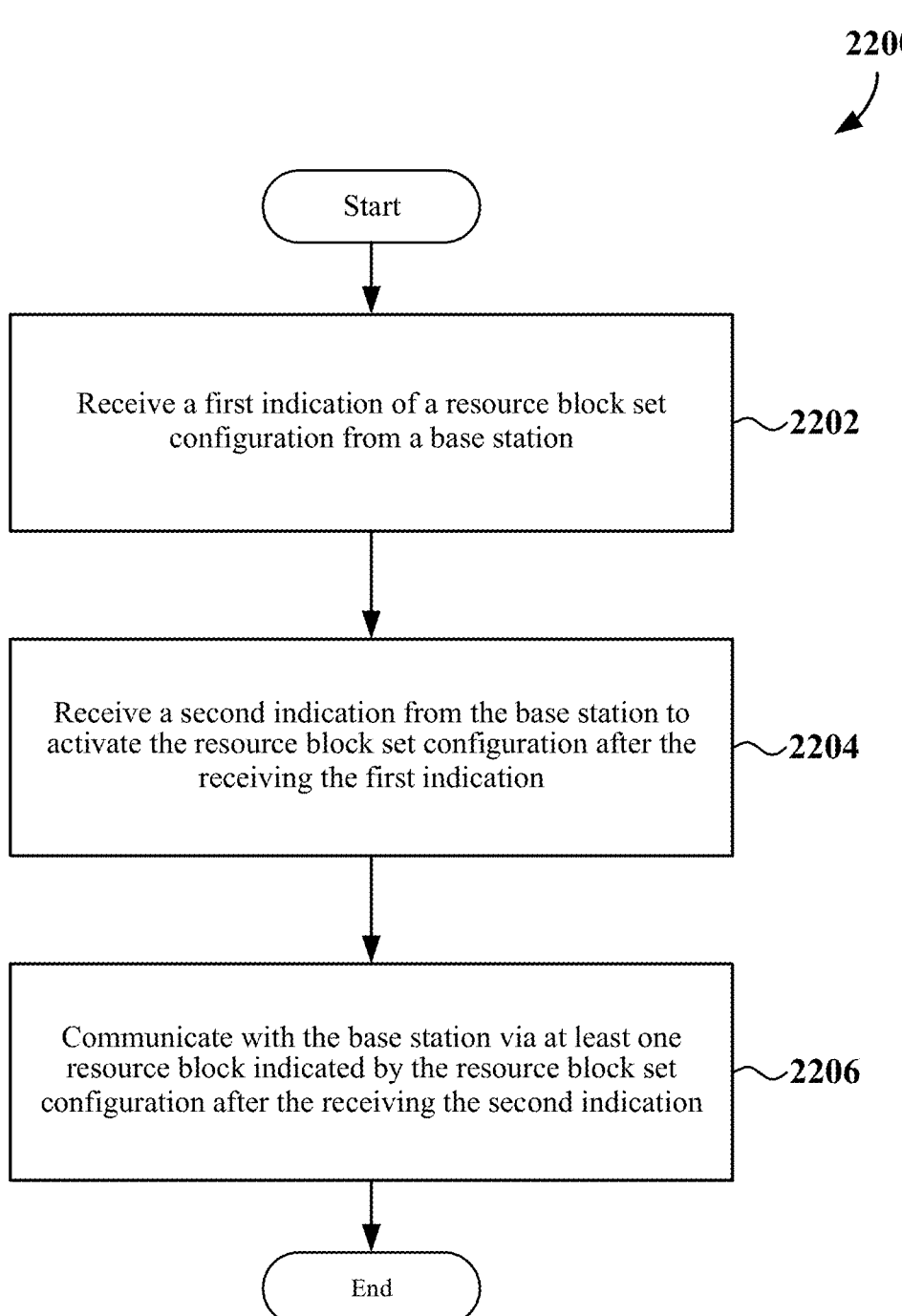

```
                    ┌──────────┐
                    │  Start   │
                    └──────────┘
                         │
                         ▼
    ┌─────────────────────────────────────────┐
    │                                         │
    │  Receive a first indication of a resource block │──  2202
    │  configuration from a base station       │
    │                                         │
    └─────────────────────────────────────────┘
                         │
                         ▼
    ┌─────────────────────────────────────────┐
    │                                         │
    │  Receive a second indication from the base station to │── 2204
    │  activate the resource block set configuration after the │
    │  receiving the first indication          │
    │                                         │
    └─────────────────────────────────────────┘
                         │
                         ▼
    ┌─────────────────────────────────────────┐
    │                                         │
    │  Communicate with the base station via at least one │── 2206
    │  resource block indicated by the resource block set │
    │  configuration after the receiving the second indication │
    │                                         │
    └─────────────────────────────────────────┘
                         │
                         ▼
                    ┌──────────┐
                    │   End    │
                    └──────────┘
```

BANDWIDTH FOR CHANNEL OCCUPANCY TIME SHARING

CROSS-REFERENCE TO RELATED APPLICATIONS

The present application for patent claims priority to and the benefit of pending U.S. Provisional Application No. 63/190,735, titled "BANDWIDTH FOR CHANNEL OCCUPANCY TIME SHARING" filed May 19, 2021, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to techniques for determining the bandwidth to be used for channel occupancy time sharing.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) for different UEs operating within a cell of the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a first wireless communication device may include a transceiver, a memory, and a processor coupled to the transceiver and the memory. The processor and the memory may be configured to receive a first transmission on a first radio frequency (RF) bandwidth (BW) from a second wireless communication device via the transceiver. In some examples, the first RF BW is defined within an unlicensed RF spectrum. The processor and the memory may also be configured to transmit a second transmission to the second wireless communication device via the transceiver on a first shared BW during a channel occupancy time (COT) associated with the second wireless communication device. In some examples, the first shared BW includes the first RF BW.

In some examples, a method for wireless communication at a first wireless communication device is disclosed. The method may include receiving a first transmission on a first radio frequency (RF) bandwidth (BW) from a second wireless communication device. In some examples, the first RF BW is defined within an unlicensed RF spectrum. The method may also include transmitting a second transmission to the second wireless communication device on a first shared BW during a channel occupancy time (COT) associated with the second wireless communication device. In some examples, the first shared BW includes the first RF BW.

In some examples, a first wireless communication device may include means for receiving a first transmission on a first radio frequency (RF) bandwidth (BW) from a second wireless communication device. In some examples, the first RF BW is defined within an unlicensed RF spectrum. The first wireless communication device may also include means for means for transmitting a second transmission to the second wireless communication device on a first shared BW during a channel occupancy time (COT) associated with the second wireless communication device. In some examples, the first shared BW includes the first RF BW.

In some examples, an article of manufacture for use by a first wireless communication device includes a non-transitory computer-readable medium having stored therein instructions executable by one or more processors of the first wireless communication device to receive a first transmission on a first radio frequency (RF) bandwidth (BW) from a second wireless communication device. In some examples, the first RF BW is defined within an unlicensed RF spectrum. The computer-readable medium may also have stored therein instructions executable by one or more processors of the first wireless communication device to transmit a second transmission to the second wireless communication device on a first shared BW during a channel occupancy time (COT) associated with the second wireless communication device. In some examples, the first shared BW includes the first RF BW.

In some examples, a first wireless communication device may include a transceiver, a memory, and a processor coupled to the transceiver and the memory. The processor and the memory may be configured to conduct a clear channel assessment (CCA) on a first radio frequency (RF) bandwidth (BW). In some examples, the first RF BW is defined within an unlicensed RF spectrum. The processor and the memory may also be configured to transmit a first transmission on a second RF BW to a second wireless communication device via the transceiver. In some examples, the second RF BW is a proper subset of the first RF BW. The processor and the memory may also be configured to receive a second transmission from the second wireless communication device via the transceiver on a first shared BW during a channel occupancy time (COT) associated with the CCA. In some examples, the first shared BW is based on the first RF BW and includes the second RF BW.

In some examples, a method for wireless communication at a first wireless communication device is disclosed. The method may include conducting a clear channel assessment (CCA) on a first radio frequency (RF) bandwidth (BW). In some examples, the first RF BW is defined within an unlicensed RF spectrum. The method may also include transmitting a first transmission on a second RF BW to a second wireless communication device. In some examples, the second RF BW is a proper subset of the first RF BW. The method may further include receiving a second transmission from the second wireless communication device on a first shared BW during a channel occupancy time (COT) associated with the CCA. In some examples, the first shared BW is based on the first RF BW and includes the second RF BW.

In some examples, a first wireless communication device may include means for conducting a clear channel assessment (CCA) on a first radio frequency (RF) bandwidth (BW). In some examples, the first RF BW is defined within an unlicensed RF spectrum. The first wireless communication device may also include means for transmitting a first transmission on a second RF BW to a second wireless communication device. In some examples, the second RF BW is a proper subset of the first RF BW. The first wireless communication device may further include means for receiving a second transmission from the second wireless communication device on a first shared BW during a channel occupancy time (COT) associated with the CCA. In some examples, the first shared BW is based on the first RF BW and includes the second RF BW.

In some examples, an article of manufacture for use by a first wireless communication device includes a non-transitory computer-readable medium having stored therein instructions executable by one or more processors of the first wireless communication device to conduct a clear channel assessment (CCA) on a first radio frequency (RF) bandwidth (BW). In some examples, the first RF BW is defined within an unlicensed RF spectrum. The computer-readable medium may also have stored therein instructions executable by one or more processors of the first wireless communication device to transmit a first transmission on a second RF BW to a second wireless communication device. In some examples, the second RF BW is a proper subset of the first RF BW. The computer-readable medium may further have stored therein instructions executable by one or more processors of the first wireless communication device to receive a second transmission from the second wireless communication device on a first shared BW during a channel occupancy time (COT) associated with the CCA. In some examples, the first shared BW is based on the first RF BW and includes the second RF BW.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 4 is a conceptual illustration of examples of channel occupancy time (COT) sharing according to some aspects.

FIG. 6 is a conceptual illustration of an example of determining shared bandwidth according to some aspects.

FIG. 7 is a conceptual illustration of examples of explicit and implicit determinations of shared bandwidth according to some aspects.

FIG. 16 is a flow chart illustrating an example wireless communication process for COT sharing according to some aspects.

FIG. 17 is a flow chart illustrating another example wireless communication process for COT sharing according to some aspects.

FIG. 19 is a flow chart illustrating another example wireless communication process including determining a shared bandwidth according to some aspects.

FIG. 22 is a flow chart illustrating an example wireless communication process including activating a resource block set configuration according to some aspects

DETAILED DESCRIPTION

Figure 1:
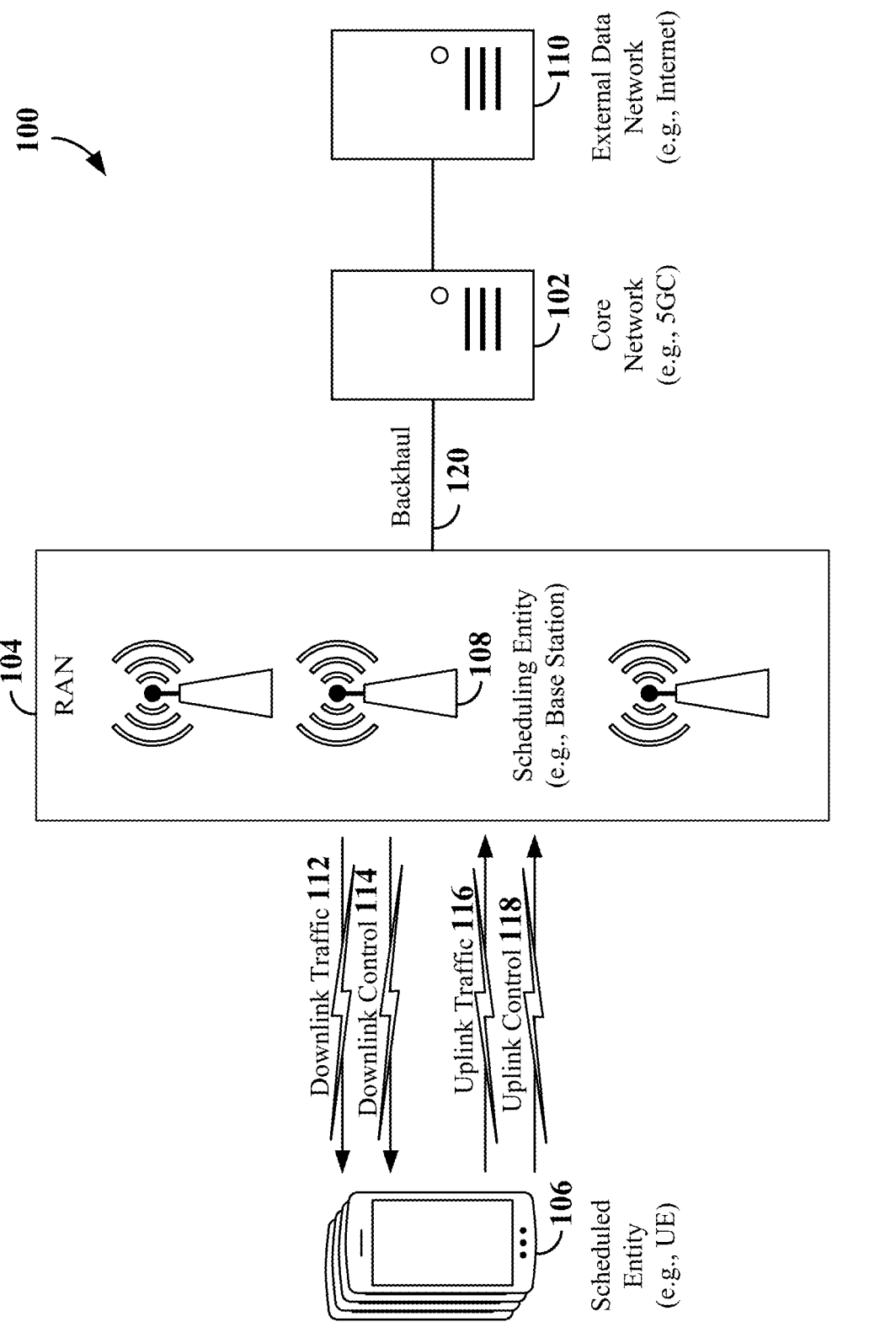
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/ purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

A wireless communication device such as a base station or a UE may use a clear channel assessment procedure such as a listen-before-talk (LBT) procedure to gain access to wireless communication resources (e.g., in unlicensed spectrum or shared spectrum). In some aspects, an LBT procedure may involve sensing (e.g., measuring) energy over a selected bandwidth (i.e., the LBT bandwidth) and comparing the sensed (e.g., measured) energy to an energy detection threshold. If the sensed energy is at or below the energy detection threshold (e.g., indicating that the channel is relatively free of traffic), the wireless communication device may elect to use all or a portion of the LBT bandwidth for a period of time that may be referred to as a channel occupancy time (COT).

A COT may be shared among wireless communication devices. For example, a base station that performs an LBT procedure and gains access to an LBT bandwidth for a COT may elect to transmit to a UE during the COT and also allow the UE to transmit to the base station during the COT. Similarly, a UE that performs an LBT procedure and gains access to an LBT bandwidth for a COT may elect to transmit to a base station during the COT and also allow the base station to transmit to the UE during the COT.

In some examples, a first wireless communication device (e.g., an initiator device) that performs an LBT procedure may transmit a transmission to a second wireless communication (e.g., a responder device) over a bandwidth that is less than the LBT bandwidth. However, the amount of bandwidth (i.e., the shared bandwidth) that the responder device may be able to use during the COT may be greater than the bandwidth of the transmission.

The disclosure relates in some aspects to determining the amount of shared bandwidth to be used for COT sharing. In various examples, a responder device may make this determination based on information that is implicit in a transmission from an initiator device or based on information that is explicitly signaled by a transmission from an initiator device. As an example of an implicit determination, a responder device may determine the shared bandwidth based at least in part on a bandwidth of a transmission from the initiator device. As an example of an explicit determination, a responder device may determine the shared bandwidth based at least in part on an indication of the shared bandwidth carried by a transmission from the initiator device.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
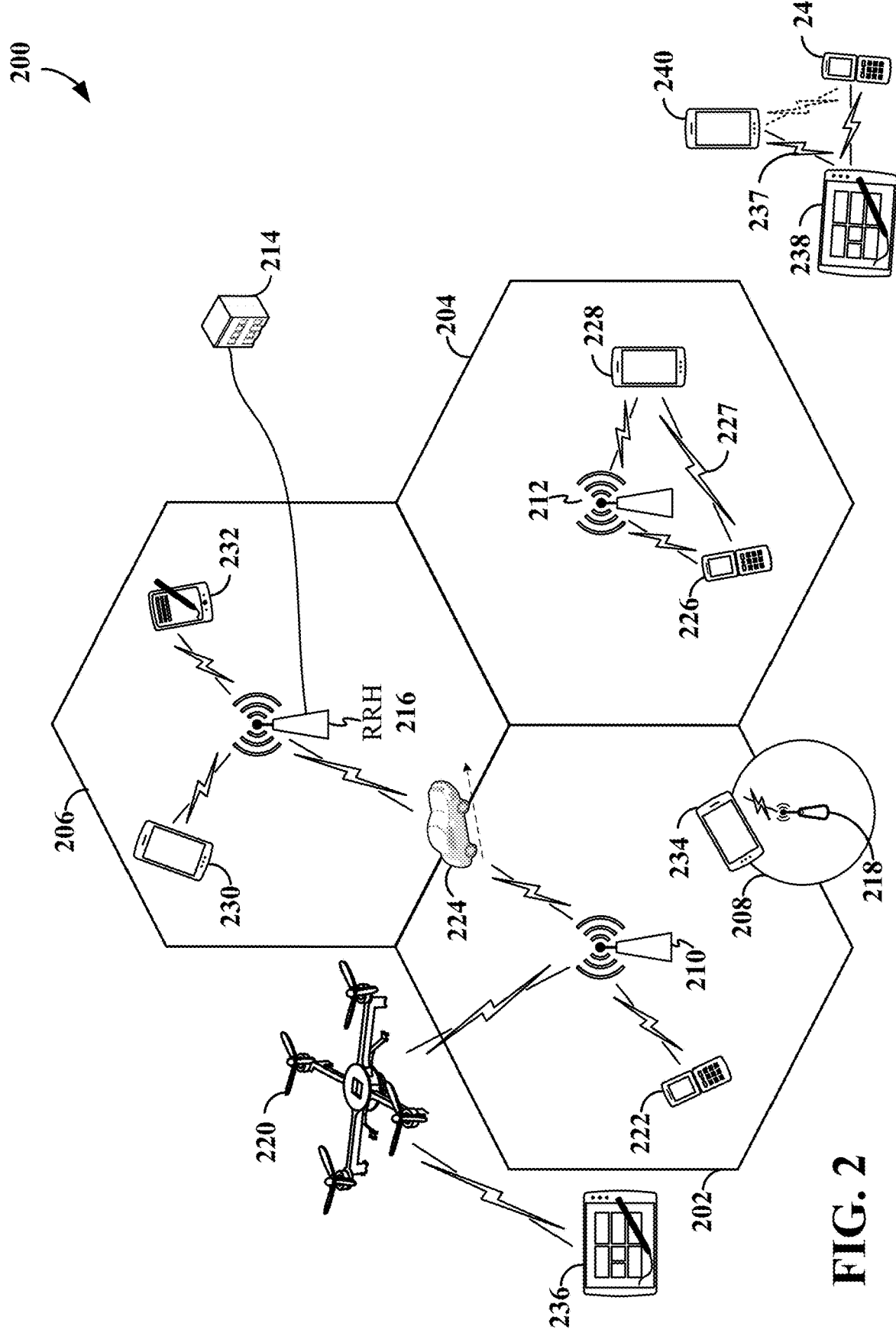
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216;

and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Figure 3:
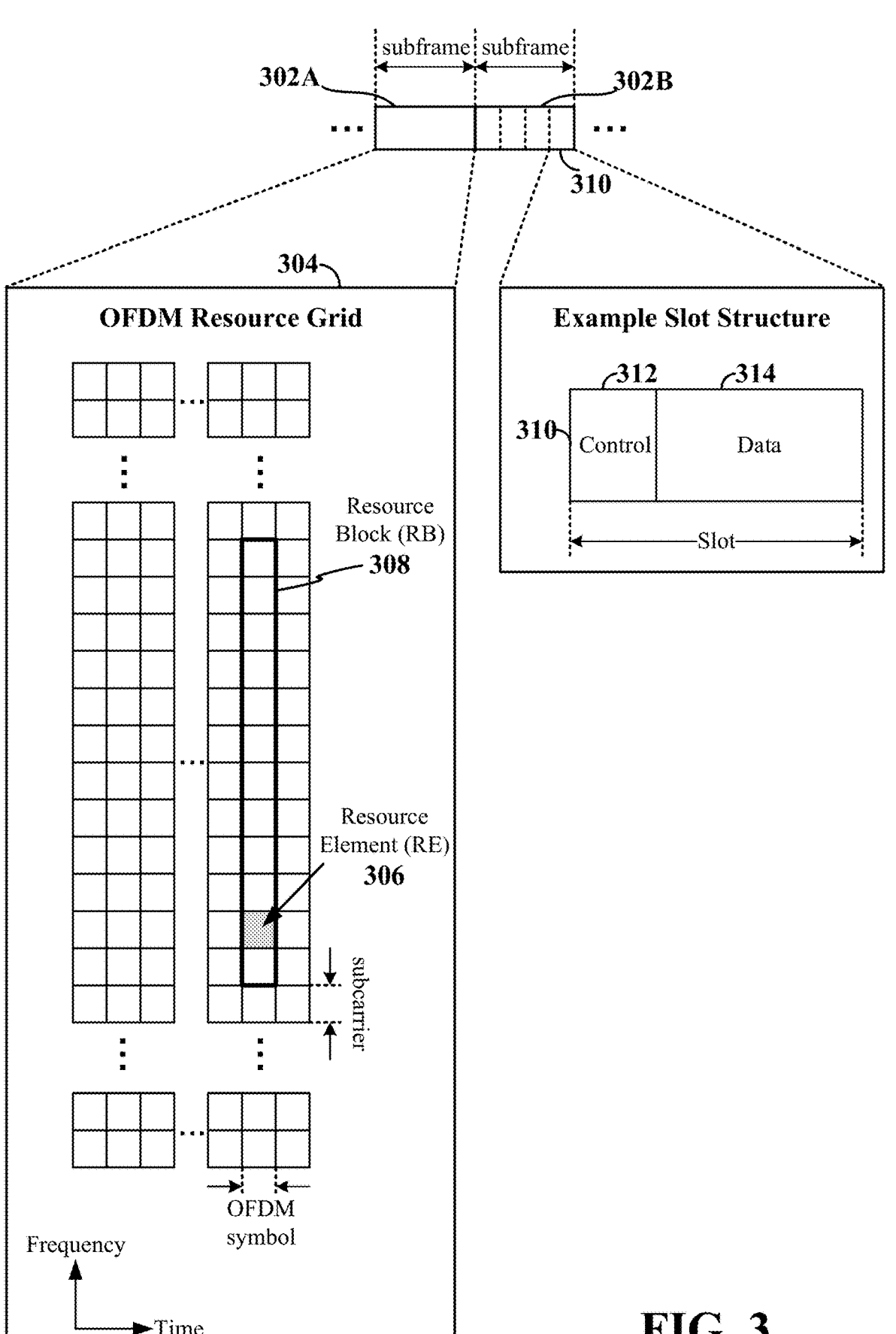
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

As mentioned above, a base station may send an UL grant or a DL grant to a UE. An UL grant may specify, for example, which resource blocks and/or which modulation and coding scheme (MCS) the BS has allocated to the UE for an UL transmission. A DL grant may specify, for example, which resource blocks and/or which MCS the BS will use for a DL transmission. Different types of grants may be used in different examples.

For a dynamic grant, a base station may send DCI to a UE to schedule an individual transmission or reception (e.g., on a physical downlink shared channel (PDSCH) or a physical uplink shared channel (PUSCH)). For example, after a UE requests uplink resources, a base station may send a first DCI to schedule a first PUSCH transmission by the UE. Then, after a UE requests additional uplink resources, the base station may send a second DCI to schedule a second PUSCH transmission, and so on.

For a configured grant (also referred to as a grant-free scheduling), a base station may configure uplink resources without having received a request for uplink resources from a UE. For example, the base station may send DCI or a radio resource control (RRC) message to indicate that certain uplink resources have been pre-configured. In some implementations, a base station may send DCI or an RRC message to activate or deactivate a configured grant.

A base station may also use semi-persistent scheduling (SPS) to schedule multiple transmissions (e.g., on PDSCH). In some examples, a base station may transmit an RRC message to configure an SPS (e.g., for a particular cell and a particular BWP) and subsequently send DCI to activate the SPS. The SPS configuration may indicate an SPS periodicity between SPS occasions. In this way, the SPS configuration may schedule multiple SPS occasions at the indicated periodicity. In some examples, the periodicity may be referenced to a system frame number (SFN) and a sub-frame number of the DCI that initializes the SPS.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system)

bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TB S), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

As discussed above, wireless communication may be conducted over unlicensed radio frequency (RF) spectrum (e.g., an unlicensed RF band) or shared RF spectrum in some scenarios. For example, a network operator may deploy cells that are configured to communicate on an unlicensed RF spectrum (e.g., in addition to cells operating on a licensed RF spectrum) to extend the coverage of the network or to provide additional services (e.g., higher throughput) to UEs operating within the network. As another example, a UE may be configured to communicate with another device (e.g., a BS or another UE) on an unlicensed RF spectrum.

In some scenarios, devices that transmit over an unlicensed RF spectrum may use a collision avoidance scheme to reduce the likelihood that multiple devices will transmit on the same RF spectrum at the same time. One example of such a collision avoidance scheme is a clear channel assessment (CCA) procedure, such as a listen-before-talk (LBT) procedure. In general, before a first device transmits on a particular RF spectrum, the first device may listen for any transmissions by any other devices on that RF spectrum. If the RF spectrum is currently being used, the first device may back-off for a period of time and then re-attempt transmission (e.g., by listening for other transmissions again). Carrier sense multiple access (CSMA) is one example of an LBT procedure. Other types of LBT procedures may be used as well.

In some aspects, an LBT procedure may involve sensing energy on the channel and comparing the energy to an energy detection (ED) threshold. For example, if the detected energy on the channel is at or below the ED threshold level (e.g., indicating that the channel is relatively free of traffic), a device may elect to transmit on the channel.

NR operation in unlicensed FR1 spectrum may be referred to as NR-U. Under NR-U, prior to gaining control of a wireless channel in an unlicensed RF spectrum, a wireless communication device (e.g., a UE or a gNB) may perform an LBT procedure on a designated frequency bandwidth. After a successful LBT procedure (e.g., indicating that a channel is free to use), a gNB may reserve the RF spectrum (e.g., channel) for a period of time. This period of time may be referred to as a channel occupancy time (COT).

In some examples, a gNB may share its COT with another device. For example, in COT sharing in NR-U, a gNB may acquire a COT (e.g., for downlink transmissions) and use part of the COT for an uplink transmission by a UE (e.g., in response to a request for uplink resources from a UE). As shown in a transmission diagram 402 of FIG. 4, during a COT 404, a gNB may transmit during a first portion 406 of the COT 404 and schedule an uplink transmission by a UE during a second portion 408 of the COT 404.

A UE may also conduct an LBT procedure to determine whether it can transmit during a COT. In some examples, a UE may share its COT with another device. Sharing of a UE-initiated channel occupancy (e.g., a configured grant-PUSCH (CG-PUSCH) or a scheduled uplink) with a gNB may be supported. For example, as shown in a transmission diagram 412 of FIG. 4, during a COT 414, a UE may transmit during a first portion 416 of the COT 414 and a gNB may transmit during a second portion 418 of the COT 414.

NR-U coexists with Wi-Fi in the 5 GHz and 6 GHz bands. Wi-Fi channel access is specified in units of 20 MHz. Thus, NR-U also uses 20 MHz as the basic channel access unit (e.g., LBT bandwidth). The available RBs in each LBT bandwidth may be referred to as an RB set.

Figure 5:
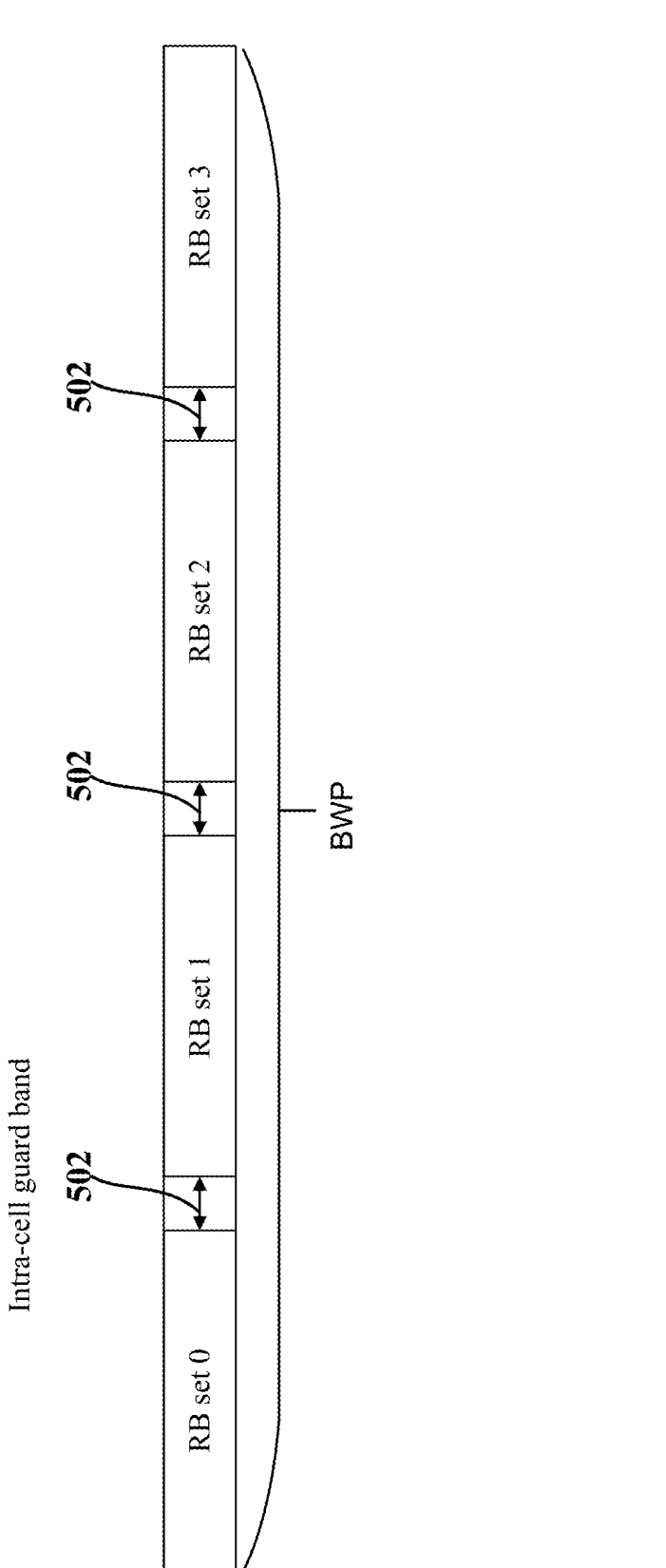
FIG. 5 is a conceptual illustration of an example of resource block sets according to some aspects.

RB sets may be defined separately for the downlink (DL) and the uplink (UL). In some aspects, an RB set may be derived from intra-cell guard band signaling as shown in a transmission diagram 500 of FIG. 5. For example, an intra-cell guard band 502 may be configured by an intraCellGuardBandDL-r16 parameter or an intraCellGuardBandUL-r16 parameter. In some examples, a guard band 502 may have a size of zero (e.g., when a gNB or a UE is performing an all-or-nothing transmission).

A gNB may send an indication of the available RB sets in a COT system information (COT-SI) broadcast. The available RB sets are based on the definition of an RB set as discussed above (20 MHz in FR1). Thus, in NR-U, given the per 20 MHz channel access, if a COT sharing device (e.g., a UE) detects a signal at least partially in a 20 MHz band, the COT sharing device may safely assume that the entire 20 MHz band is available for sharing.

The disclosure relates in some aspects to COT sharing for non-FR1 channel access for unlicensed spectrum (e.g., channel access on unlicensed spectrum for FR2x or other bands). FR2x is an extension of FR2 in the 60 GHz range (e.g., 52.6 GHz to 71 GHz). One mode of operation for FR2x involves LBT-based contention resolution.

In contrast with FR1 where a bandwidth of 20 MHz (the LBT bandwidth) is specified for LBT sensing and access, in higher bands such as FR2x, a fixed LBT bandwidth is not mandated for LBT sensing. For example, in FR2x, a device may specify the bandwidth (BW) in the energy detection threshold (EDT) formula set forth in Equation 1.

$$\text{EDT} = -80 \text{ dBm} + 10 \times \log 10(\text{BW [MHz]}) + 10 \times \log 10(P_{max} [W]/P_{out} [W]) \qquad \text{EQUATION 1}$$

Thus, a gNB or UE may select its own LBT bandwidth (e.g., as long as it covers the transmission bandwidth). That is, the LBT bandwidth is not restricted to a 20 MHz band.

In a similar manner as discussed above, two devices (e.g., a gNB and a UE) can share a COT for FR2x. One device (an initiator device) performs the LBT procedure over a particular bandwidth and initiates transmissions. The other device (a responder device) then responds within the allowed bandwidth.

In contrast with FR 1 where a responder device can readily determine the allowed bandwidth (i.e., the 20 MHz band on which the initiator performed the LBT procedure), a responder device for FR2x cannot assume that the initiator device performed the LBT procedure on a 20 MHz band. Thus, in FR2x, since the LBT bandwidth may be selected by the initiator, a responder device might not be able to simply detect a waveform as implicit signaling of COT sharing.

Also, in FR2x, a COT-SI might not be configured or, if a COT-SI is configured, the COT-SI might not be detected by a responder device.

The disclosure relates in some aspects to COT sharing and to determining the shared bandwidth to be used between the devices participating in the COT sharing. For example, the techniques disclosed herein may be used for determining a shared bandwidth in scenarios where the width of the shared bandwidth is not predefined.

Figure 6:
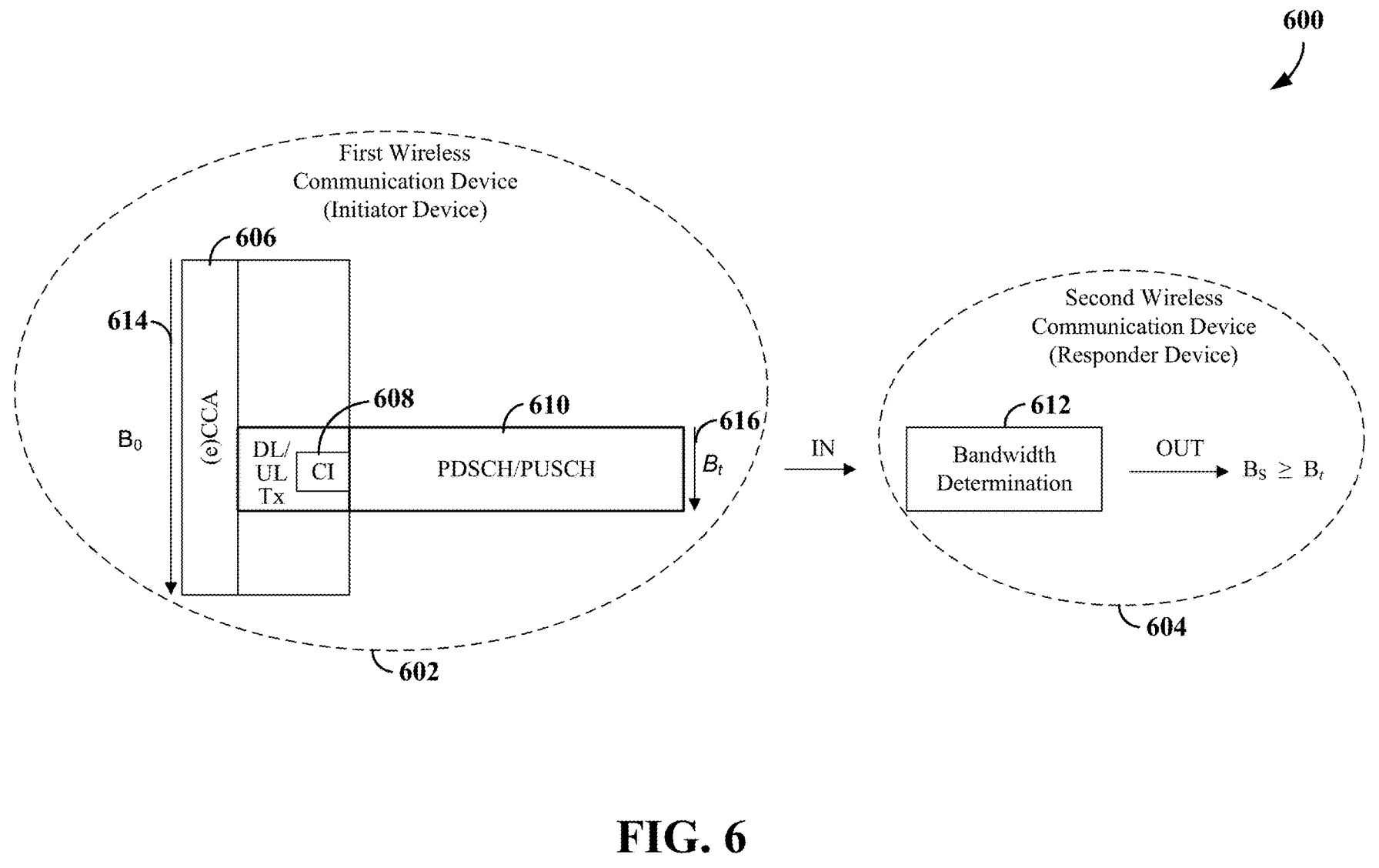

Referring to FIG. 6, a communication system 600 conceptually illustrates operations and signaling for a first wireless communication device 602 and a second wireless communication device 604. The first wireless communication device (an initiator device) 602 is in communication with a second wireless communication device (a responder device) 604 for COT sharing. The first wireless communication device 602 performs a CCA procedure (e.g., an extended CCA (eCCA) procedure) such as an LBT procedure on a set of resources 606 corresponding to a bandwidth $B_0$ (e.g., an LBT bandwidth). The bandwidth $B_0$ is represented in FIG. 6 by an arrow 614 (e.g., indicating the bandwidth from an initial RB to an ending RB).

In the event the LBT procedure passes (e.g., the bandwidth $B_0$ is free to use), the first wireless communication device 602 conducts a transmission on a transmission bandwidth $B_t$, where $B_t$ is a proper subset of $B_0$ (i.e., $B_t < B_0$). The bandwidth $B_t$ is represented in FIG. 6 by an arrow 616 (e.g., indicating the bandwidth from an initial RB to an ending RB). This transmission includes control information (CI) 608 and data 610, and may be conducted for a downlink (DL), an uplink (UL), or some other type of link. For example, for downlink to uplink COT sharing, the first wireless communication device 602 may transmit a downlink transmission including downlink control information (DCI) and a PDSCH as the CI 608 and data 610, respectively. For uplink to downlink COT sharing, the first wireless communication device 602 may transmit an uplink transmission including a configured grant uplink control information (CG UCI) and a PUSCH as the CI 608 and data 610, respectively. Other types of transmissions may be sent in other examples.

Based at least in part on the transmission on the bandwidth $B_t$ from the first wireless communication device 602, a bandwidth determination circuit 612 of the second wireless communication device 604 determines the shared bandwidth $B_s$ to be used for further transmissions for the COT sharing, where $B_s \geq B_t$. For example, the second wireless communication device 604 may transmit a transmission to the first wireless communication device 602 on the shared bandwidth $B_s$.

FIG. 7 illustrates two example techniques for determining the shared bandwidth. A first technique involves determining the shared bandwidth based on explicit information sent by an initiator device in a transmission. A second technique involves determining the shared bandwidth based on information that is implicit in a transmission sent by an initiator device.

In a first example 702 shown in FIG. 7, a bandwidth determination circuit 704 uses an explicit-based technique where the determination of the shared bandwidth is based at least in part on an indication obtained by decoding a transmission from an initiator device. For example, the bandwidth determination circuit 704 may determine the shared bandwidth $B_s$ from an indication in a message received from an initiator device.

In a second example 706 shown in FIG. 7, a bandwidth determination circuit 708 uses an implicit-based technique where the determination of the shared bandwidth is based at least in part on the detection of a transmission bandwidth occupation related to a transmission from an initiator device. For example, the bandwidth determination circuit 708 may determine the shared bandwidth $B_s$ based on the bandwidth $B_t$ of the transmission received from an initiator device.

Figure 8:
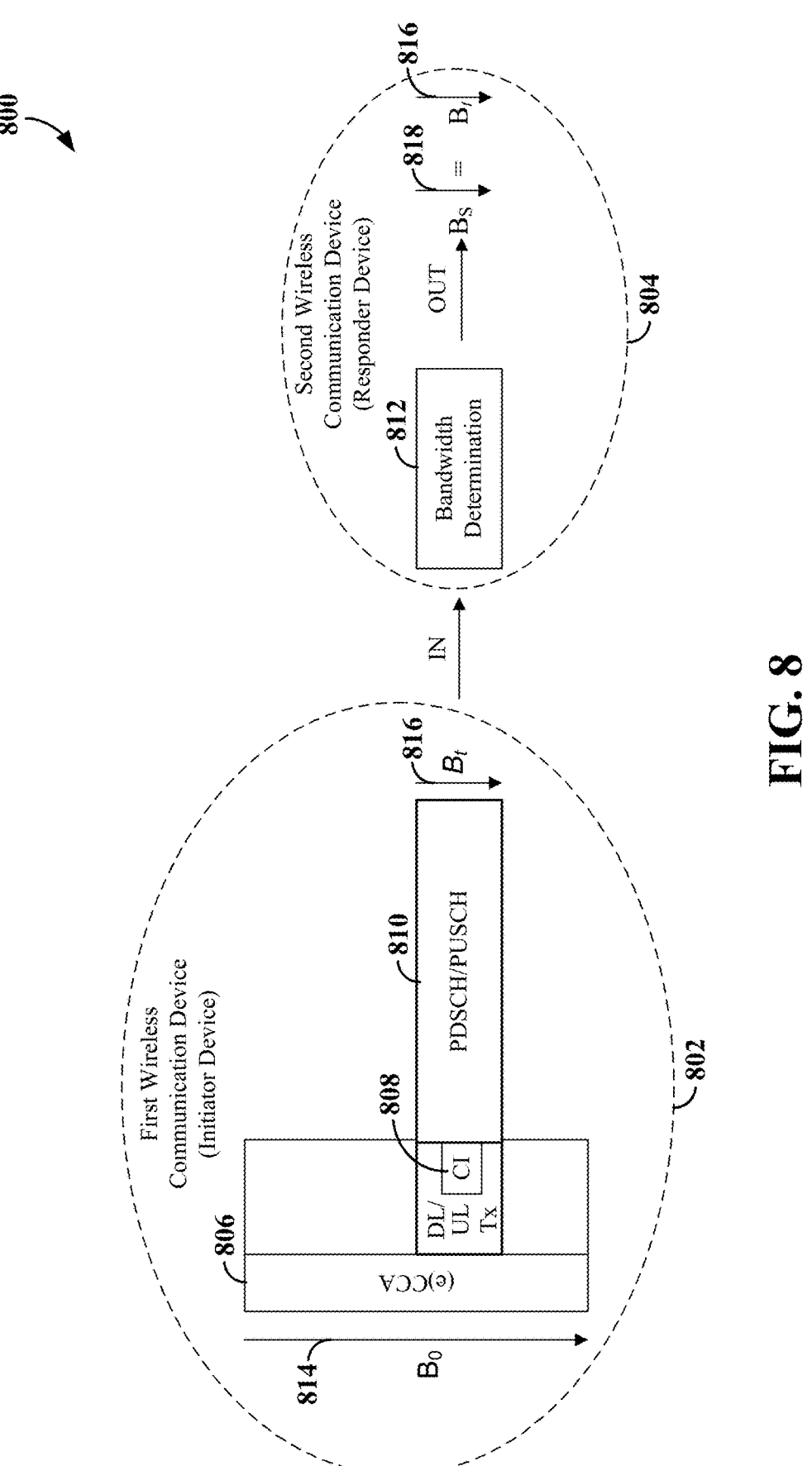
FIG. 8 is a conceptual illustration of a first example of an implicit determination of shared bandwidth according to some aspects.

FIG. 8 illustrates an example of an implicit-based technique (implicit signaling) where the shared bandwidth is dependent on the detected transmission bandwidth. This technique may be used even if RB sets are not defined or introduced in FR2x.

If a responder device detects a COT-initiating transmission from an initiating device, the responder device may assume that the RBs in the transmission bandwidth are available for sharing. In some aspects, this may be a relatively conservative sharing approach, where the responder assumes that the initiating node performed LBT over the transmission bandwidth $B_t$.

Referring to FIG. 8, a communication system 800 conceptually illustrates operations and signaling for a first wireless communication device 802 and a second wireless communication device 804. The first wireless communication device (an initiator device) 802 is in communication with a second wireless communication device (a responder device) 804 for COT sharing. The first wireless communication device 802 performs a CCA procedure (e.g., an extended CCA procedure) such as an LBT procedure on a set of resources 806 corresponding to a bandwidth $B_0$ (e.g., an LBT bandwidth). The bandwidth $B_0$ is represented in FIG. 8 by an arrow 814 (e.g., indicating the bandwidth from an initial RB to an ending RB).

In the event the LBT procedure passes (e.g., the bandwidth $B_0$ is free to use), the first wireless communication device 802 conducts a transmission on a transmission bandwidth $B_t$, where $B_t$ is a proper subset of $B_0$ (i.e., $B_t < B_0$). The bandwidth $B_t$ is represented in FIG. 8 by an arrow 816 (e.g., indicating the bandwidth from an initial RB to an ending RB). This transmission includes control information (CI) 808 and data 810, and may be conducted for a downlink (DL), an uplink (UL), or some other type of link. For example, for downlink to uplink COT sharing, the first wireless communication device 802 may transmit a downlink transmission including downlink control information (DCI) and a PDSCH as the CI 808 and data 810, respectively. For uplink to downlink COT sharing, the first wireless communication device 802 may transmit an uplink transmission including a configured grant uplink control information (CG UCI) and a PUSCH as the CI 808 and data 810, respectively. Other types of transmissions may be sent in other examples.

In this example, a bandwidth determination circuit 812 of the second wireless communication device 804 determines the shared bandwidth $B_s$ 820 based the bandwidth $B_t$ of the transmission from the first wireless communication device 802. Specifically, the shared bandwidth $B_s$ is set equal to the bandwidth $B_t$ in this case.

Figure 9:
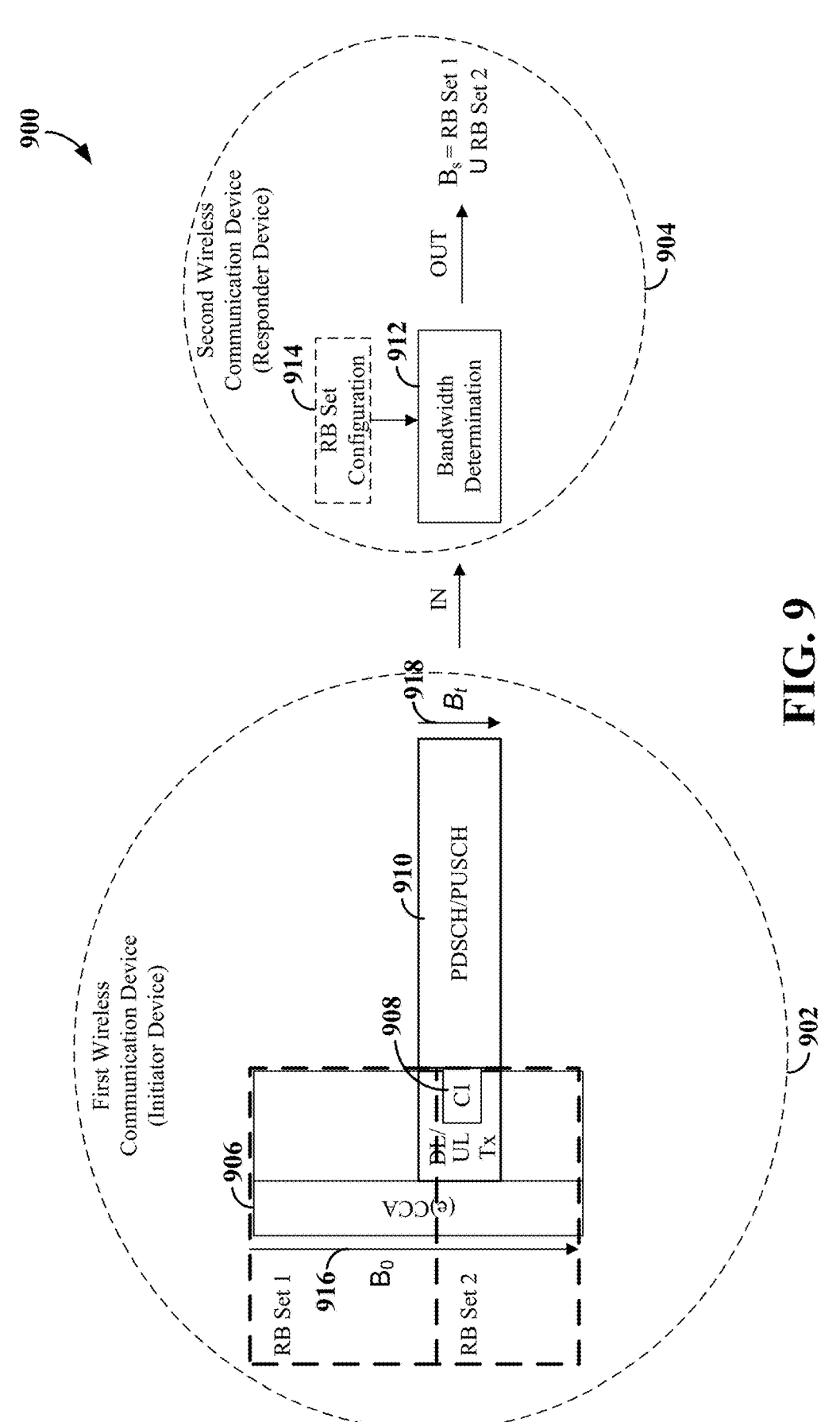
FIG. 9 is a conceptual illustration of a second example of an implicit determination of shared bandwidth according to some aspects.

FIG. 9 illustrates an example of an implicit-based technique (RB set-based implicit signaling) where the shared bandwidth is dependent on the detected transmission bandwidth and RB set information. Here, if a responder device detects a signal (e.g., partially) in an RB set, the responder device can assume that the entire RB set passed the LBT procedure and that the COT can be shared in the entire RB set. Thus, when the responder device receives a transmission, the responder device can identify the RB set(s) that the transmission (partially) occupies and assume that the initiator device's LBT procedure covered this RB set or these RB sets.

Referring to FIG. 9, a communication system 900 conceptually illustrates operations and signaling for a first wireless communication device 902 and a second wireless communication device 904. The first wireless communication device (an initiator device) 902 is in communication with a second wireless communication device (a responder device) 904 for COT sharing. The first wireless communication device 902 performs a CCA procedure (e.g., an extended CCA procedure) such as an LBT procedure on a set of resources 906 corresponding to a bandwidth $B_0$ (e.g., an LBT bandwidth). The bandwidth $B_0$ is represented in FIG. 9 by an arrow 916 (e.g., indicating the bandwidth from an initial RB to an ending RB).

In the event the LBT procedure passes (e.g., the bandwidth $B_0$ is free to use), the first wireless communication device 902 conducts a transmission on a transmission bandwidth $B_t$, where $B_t$ is a proper subset of $B_0$ (i.e., $B_t < B_0$). The bandwidth $B_t$ is represented in FIG. 9 by an arrow 918 (e.g., indicating the bandwidth from an initial RB to an ending RB). This transmission includes control information (CI) 908 and data 910, and may be conducted for a downlink (DL), an uplink (UL), or some other type of link. For example, for downlink to uplink COT sharing, the first wireless communication device 902 may transmit a downlink transmission including downlink control information (DCI) and a PDSCH as the CI 908 and data 910, respectively. For uplink to downlink COT sharing, the first wireless communication device 902 may transmit an uplink transmission including a configured grant uplink control information (CG UCI) and a PUSCH as the CI 908 and data 910, respectively. Other types of transmissions may be sent in other examples.

In this example, the second wireless communication device 904 maintains an RB set configuration 914 that identifies the RB sets used by the first wireless communication device 902 when performing an LBT procedure. In some examples, the second wireless communication device 904 (e.g., a UE) may receive the RB set configuration from the first wireless communication device 902 (e.g., a gNB).

In the example of FIG. 9, by transmitting the transmission on a bandwidth $B_t$ that includes at least a portion of RB Set 1 and at least a portion of RB Set 2, the first wireless communication device 902 may inform the second wireless communication device 904 that the LBT procedure was performed over RB Set 1 and RB Set 2.

Thus, upon receiving this transmission, a bandwidth determination circuit 912 of the second wireless communication device 904 determines the shared bandwidth $B_s$ based the bandwidth $B_t$ of the transmission from the first wireless communication device 902 and the RB set configuration 914. For example, the bandwidth determination circuit 912 can determine that the bandwidth $B_t$ includes RBs from RB Set 1 and RB Set 2. Thus, the bandwidth determination circuit 912 can set the shared bandwidth $B_s$ equal to the union of RB Set 1 and RB Set 2.

Figure 10:
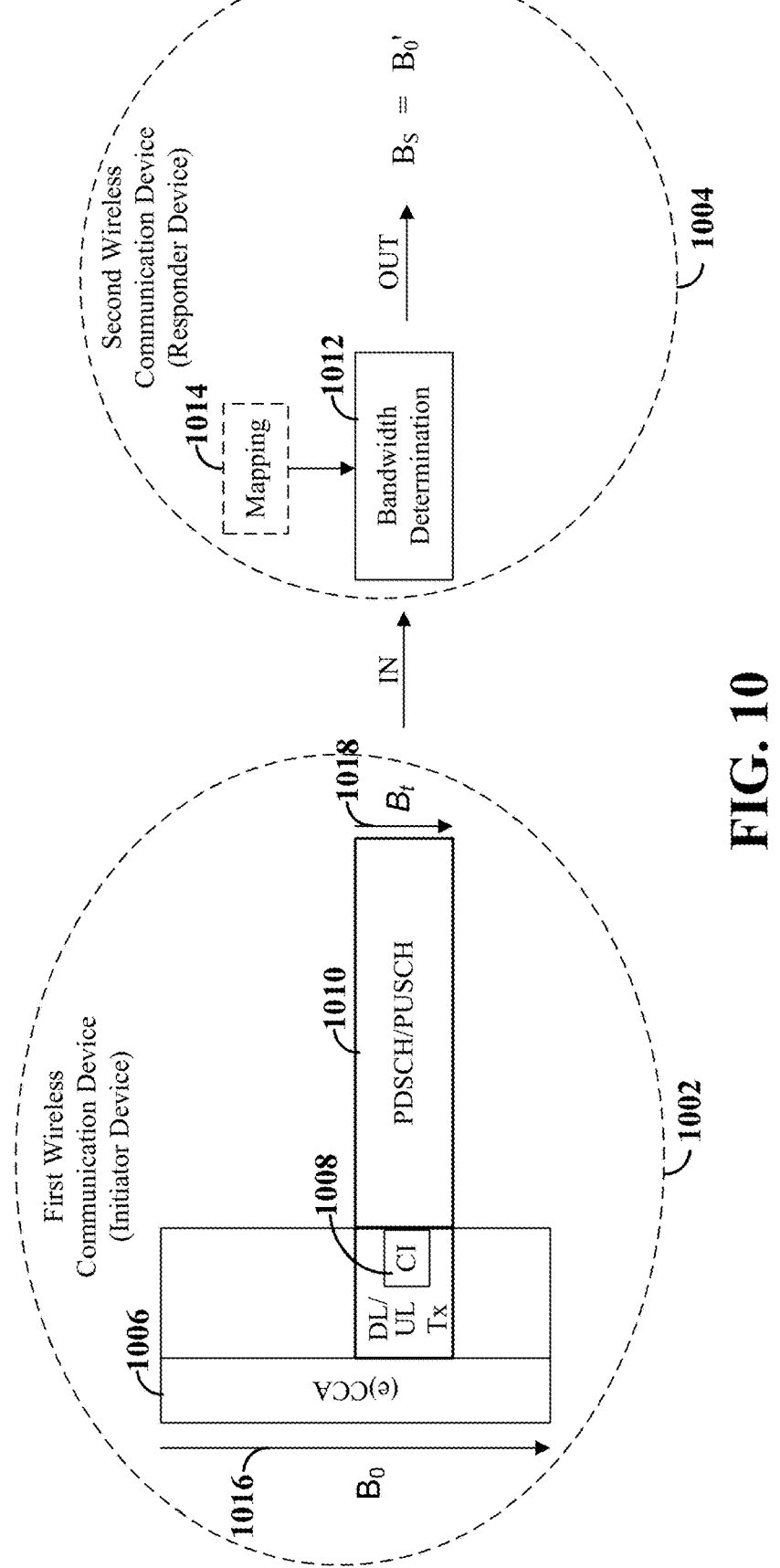
FIG. 10 is a conceptual illustration of a third example of an implicit determination of shared bandwidth according to some aspects.

FIG. 10 illustrates an example of an implicit-based technique (mapping-based implicit signaling) where the shared bandwidth is dependent on the detected transmission bandwidth and mapping information. If a responder device detects a signal on a certain bandwidth, the responder device can assume that the LBT passed on a corresponding mapped bandwidth and that the COT can be shared in this mapped bandwidth. Thus, RB sets do not need to be defined in this technique (although they can be optionally defined).

The mapping may map different transmission bandwidths to different associated LBT bandwidths. These different bandwidths might overlap or might not overlap in different examples.

In some examples, the mapping may be defined as a set of parameters in a RRC configuration of a specific transmission. For example, for a configured grant uplink (CG UL) transmission (e.g., CG-PUSCH, SRS, PUCCH, etc.), the RRC configuration for such a transmission may include a parameter that associates an LBT bandwidth to the RBs used for the transmission.

In some examples, the mapping may be unrelated to specific transmissions. For example, a separate mapping may be defined from a transmission bandwidth (e.g., defined by the starting RB and the quantity of RBs) to an associated LBT bandwidth (e.g., defined by the starting RB and the quantity of RBs) that covers the transmission bandwidth. In some examples, the mapping may take the form of a list that includes these pairs of definitions (e.g., the list may be a dedicated RRC configuration). When a responding device uses the list, the responding device may round up an actual transmission bandwidth to a transmission bandwidth in the list, and assume that the associated LBT bandwidth for that rounded-up transmission bandwidth is available for COT sharing.

Referring to FIG. 10, a communication system 1000 conceptually illustrates operations and signaling for a first wireless communication device 1002 and a second wireless communication device 1004. The first wireless communication device (an initiator device) 1002 is in communication with a second wireless communication device (a responder device) 1004 for COT sharing. The first wireless communication device 1002 performs a CCA procedure (e.g., an extended CCA procedure) such as an LBT procedure on a set of resources 1006 corresponding to a bandwidth $B_0$ (e.g., an LBT bandwidth). The bandwidth $B_0$ is represented in FIG. 10 by an arrow 1016 (e.g., indicating the bandwidth from an initial RB to an ending RB).

In the event the LBT procedure passes (e.g., the bandwidth $B_0$ is free to use), the first wireless communication device 1002 conducts a transmission on a transmission bandwidth $B_t$, where $B_t$ is a proper subset of $B_0$ (i.e., $B_t < B_0$). The bandwidth $B_t$ is represented in FIG. 10 by an arrow 1018 (e.g., indicating the bandwidth from an initial RB to an ending RB). This transmission includes control information (CI) 1008 and data 1010, and may be conducted for a downlink (DL), an uplink (UL), or some other type of link. For example, for downlink to uplink COT sharing, the first wireless communication device 1002 may transmit a downlink transmission including downlink control information (DCI) and a PDSCH as the CI 1008 and data 1010, respectively. For uplink to downlink COT sharing, the first wireless communication device 1002 may transmit an uplink transmission including a configured grant uplink control information (CG UCI) and a PUSCH as the CI 1008 and data 1010, respectively. Other types of transmissions may be sent in other examples.

In this example, the second wireless communication device 1004 has mapping information 1014 that identifies one or more bandwidths that can be used by the first wireless communication device 1002 when performing an LBT procedure. In some examples, the second wireless communication device 1004 (e.g., a UE) may receive the mapping information 1014 from the first wireless communication device 1002 (e.g., a gNB).

In the example of FIG. 10, by transmitting the transmission on a bandwidth $B_t$, the first wireless communication device 1002 may inform the second wireless communication device 1004 that the LBT procedure was performed over a particular bandwidth (according to the mapping).

Thus, upon receiving this transmission, a bandwidth determination circuit 1012 of the second wireless communication device 1004 determines the shared bandwidth $B_s$ based the bandwidth $B_t$ of the transmission from the first wireless communication device 1002 and the mapping information 1014. For example, the bandwidth determination circuit 1012 can determine that the bandwidth $B_t$ maps to the bandwidth $B_0$ or a particular subset of $B_0$ (e.g., $B_0'$).

Figure 11:
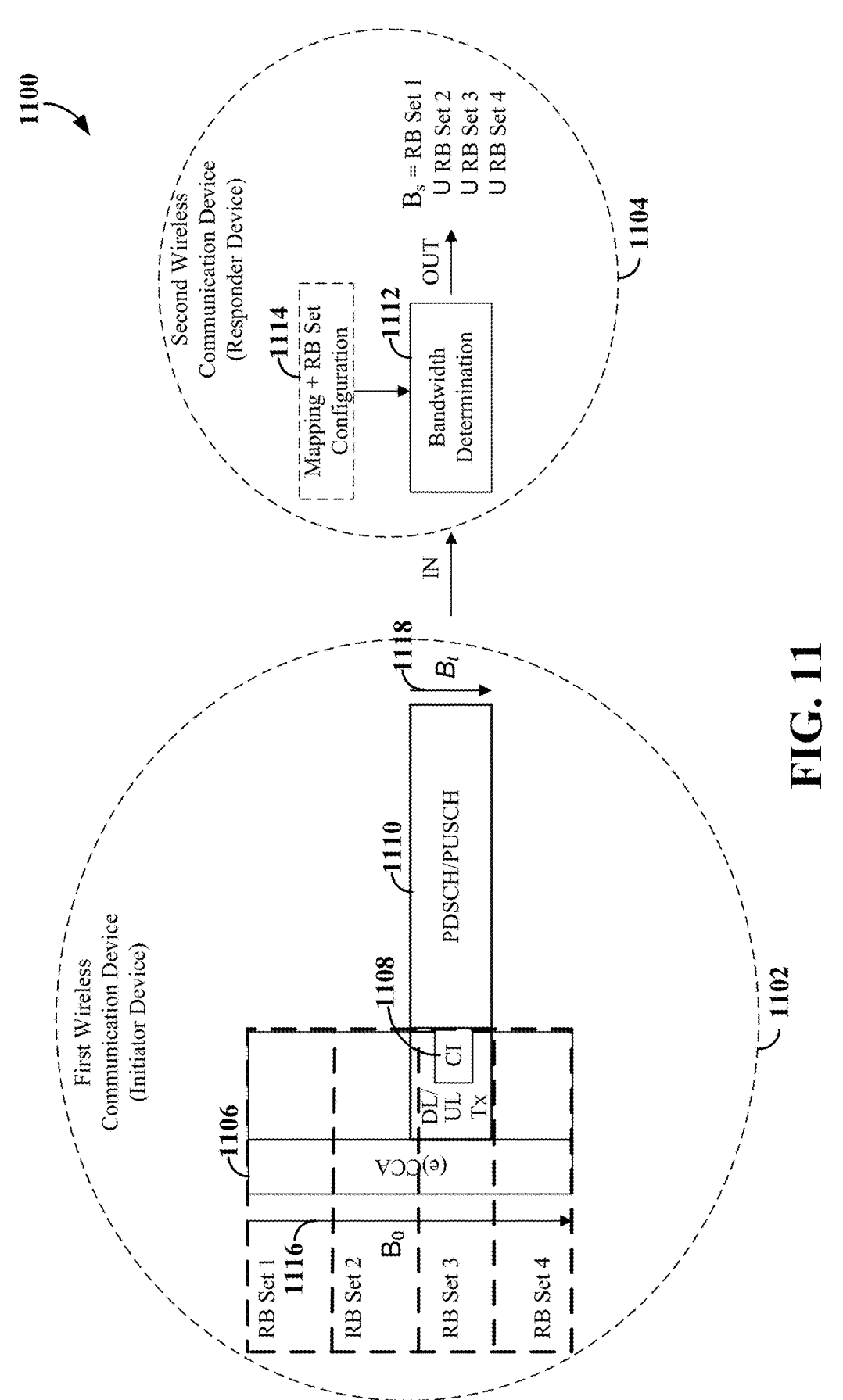
FIG. 11 is a conceptual illustration of a fourth example of an implicit determination of shared bandwidth according to some aspects.

FIG. 11 illustrates an example of an implicit-based technique (RB set+mapping-based implicit signaling) where the shared bandwidth is dependent on the detected transmission bandwidth, mapping information, and an RB set configuration. In this example, the mapped LBT bandwidth is defined in terms of RB sets.

Referring to FIG. 11, a communication system 1100 conceptually illustrates operations and signaling for a first wireless communication device 1102 and a second wireless communication device 1104. The first wireless communication device (an initiator device) 1102 is in communication with a second wireless communication device (a responder device) 1104 for COT sharing. The first wireless communication device 1102 performs a CCA procedure (e.g., an extended CCA procedure) such as an LBT procedure on a set of resources 1106 corresponding to a bandwidth $B_0$ (e.g., an LBT bandwidth). The bandwidth $B_0$ is represented in FIG. 11 by an arrow 1116 (e.g., indicating the bandwidth from an initial RB to an ending RB).

In the event the LBT procedure passes (e.g., the bandwidth $B_0$ is free to use), the first wireless communication device 1102 conducts a transmission on a transmission bandwidth $B_t$, where $B_t$ is a proper subset of $B_0$ (i.e., $B_t < B_0$). The bandwidth $B_t$ is represented in FIG. 11 by an arrow 1118 (e.g., indicating the bandwidth from an initial RB to an ending RB). This transmission includes control information (CI) 1108 and data 1110, and may be conducted for a downlink (DL), an uplink (UL), or some other type of link. For example, for downlink to uplink COT sharing, the first wireless communication device 1102 may transmit a downlink transmission including downlink control information (DCI) and a PDSCH as the CI 1108 and data 1110, respectively. For uplink to downlink COT sharing, the first wireless communication device 1102 may transmit an uplink transmission including a configured grant uplink control information (CG UCI) and a PUSCH as the CI 1108 and data 1110, respectively. Other types of transmissions may be sent in other examples.

In this example, the second wireless communication device 1104 has mapping information and RB set configuration information 1114 that identifies one or more RB sets that can be used by the first wireless communication device 1102 when performing an LBT procedure. In some examples, the second wireless communication device 1104 (e.g., a UE) may receive the mapping information and RB set configuration information 1114 from the first wireless communication device 1102 (e.g., a gNB).

In the example of FIG. 11, by transmitting the transmission on a bandwidth $B_t$, the first wireless communication device 1102 may inform the second wireless communication device 1104 that the LBT procedure was performed over a particular set of RBs (according to the mapping).

Thus, upon receiving this transmission, a bandwidth determination circuit 1112 of the second wireless communication device 1104 determines the shared bandwidth $B_s$ based the bandwidth $B_t$ of the transmission from the first wireless communication device 1102 and the mapping information and RB set configuration information 1114. For example, the bandwidth determination circuit 1112 can determine that the bandwidth $B_t$ maps to the union of RB Set 1, RB Set 2, RB Set 3, and RB Set 4 (or maps to some other RB set(s)).

Figure 12:
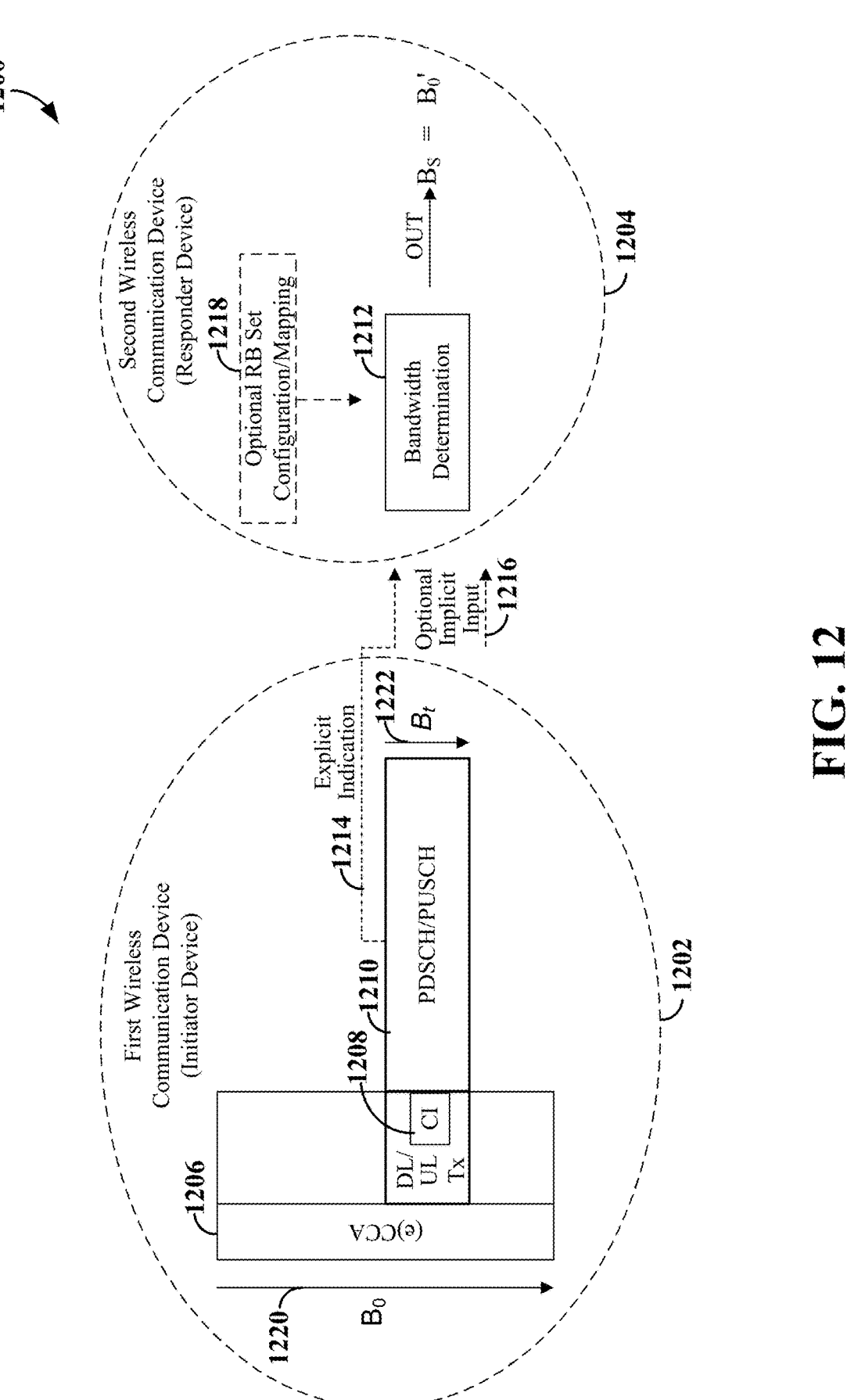
FIG. 12 is a conceptual illustration of an example of an explicit determination of shared bandwidth according to some aspects.

FIG. 12 illustrates an example of an explicit-based technique where an initiator device sends an explicit indication of the LBT bandwidth to the responder device. In some examples, the indication may be included in DCI (e.g., for DL transmission) or UCI (e.g., for a CG PUSCH transmission). Upon receiving a transmission with such an indication, a responder device will decode the transmission to recover the indication. In some aspects, this explicit-based technique may be used to signal more bandwidth than the amount of bandwidth than is used for a transmission.

The explicit-based technique may be used with one or more of the techniques discussed herein. For example, an explicit-based technique may be used with an implicit-based technique. As another example, an explicit-based technique can be used with RB sets or with an explicit indication of RBs (e.g., defined by the starting RB and the quantity of RBs).

Referring to FIG. 12, a communication system 1200 conceptually illustrates operations and signaling for a first wireless communication device 1202 and a second wireless communication device 1204. The first wireless communication device (an initiator device) 1202 is in communication with a second wireless communication device (a responder device) 1204 for COT sharing. The first wireless communication device 1202 performs a CCA procedure (e.g., an extended CCA procedure) such as an LBT procedure on a set of resources 1206 corresponding to a bandwidth $B_0$ (e.g., an LBT bandwidth). The bandwidth $B_0$ is represented in FIG. 12 by an arrow 1220 (e.g., indicating the bandwidth from an initial RB to an ending RB).

In the event the LBT procedure passes (e.g., the bandwidth $B_0$ is free to use), the first wireless communication device 1202 conducts a transmission on a transmission bandwidth $B_t$, where $B_t$ is a proper subset of $B_0$ (i.e., $B_t < B_0$). The bandwidth $B_t$ is represented in FIG. 12 by an arrow 1222 (e.g., indicating the bandwidth from an initial RB to an ending RB). This transmission includes control information (CI) 1208 and data 1210, and may be conducted for a downlink (DL), an uplink (UL), or some other type of link. For example, for downlink to uplink COT sharing, the first wireless communication device 1202 may transmit a downlink transmission including downlink control information (DCI) and a PDSCH as the CI 1208 and data 1210, respectively. For uplink to downlink COT sharing, the first wireless communication device 1202 may transmit an uplink transmission including a configured grant uplink control information (CG UCI) and a PUSCH as the CI 1208 and data 1210, respectively. Other types of transmissions may be sent in other examples.

In this example, the first wireless communication device 1202 transmits an indication 1214 of the shared bandwidth to the second wireless communication device 1204. Thus, upon receiving and decoding this transmission, a bandwidth determination circuit 1212 of the second wireless communication device 1204 may determine the shared bandwidth $B_s$ from the indication (e.g., the indication may specify or otherwise indicate the shared bandwidth).

In some examples, the bandwidth determination circuit 1212 may determine the shared bandwidth $B_s$ based on the indication and based on the bandwidth $B_t$ of the transmission 1216. For example, the indication may specify a certain shared bandwidth $B_s$ for a certain transmission bandwidth $B_t$.

In some examples, the bandwidth determination circuit 1212 may determine the shared bandwidth $B_s$ based on the indication and based on mapping information or RB set configuration information 1218. For example, the indication may specify a certain set of RBs or a certain LBT bandwidth for a certain transmission bandwidth $B_t$.

The disclosure relates in some aspects to a flexible approach for defining RB sets. This approach may be used in any of the RB set-based techniques described herein (e.g., in conjunction with any of FIGS. 9, 11, and 12).

In some examples, an RB set configuration is configured via RRC signaling. RB sets may be defined for DL transmissions, UL transmissions, COT sharing transmissions, or a combination of two or more of these transmissions. For a DL transmission, a gNB can configure DL RB sets according to the gNB's implementation in some examples.

For an UL transmission, a UE may send a request to a gNB for a particular LBT structure. In this case, the gNB may confirm this request by sending the requested UL RB set configuration to the UE.

In some examples, an RB set configuration may be dynamically activated and deactivated. For example, an RB set configuration that was configured by an RRC message may be dynamically activated or deactivated via DCI signaling (e.g., with a field value mapped to the corresponding RRC configuration).

Figure 13:
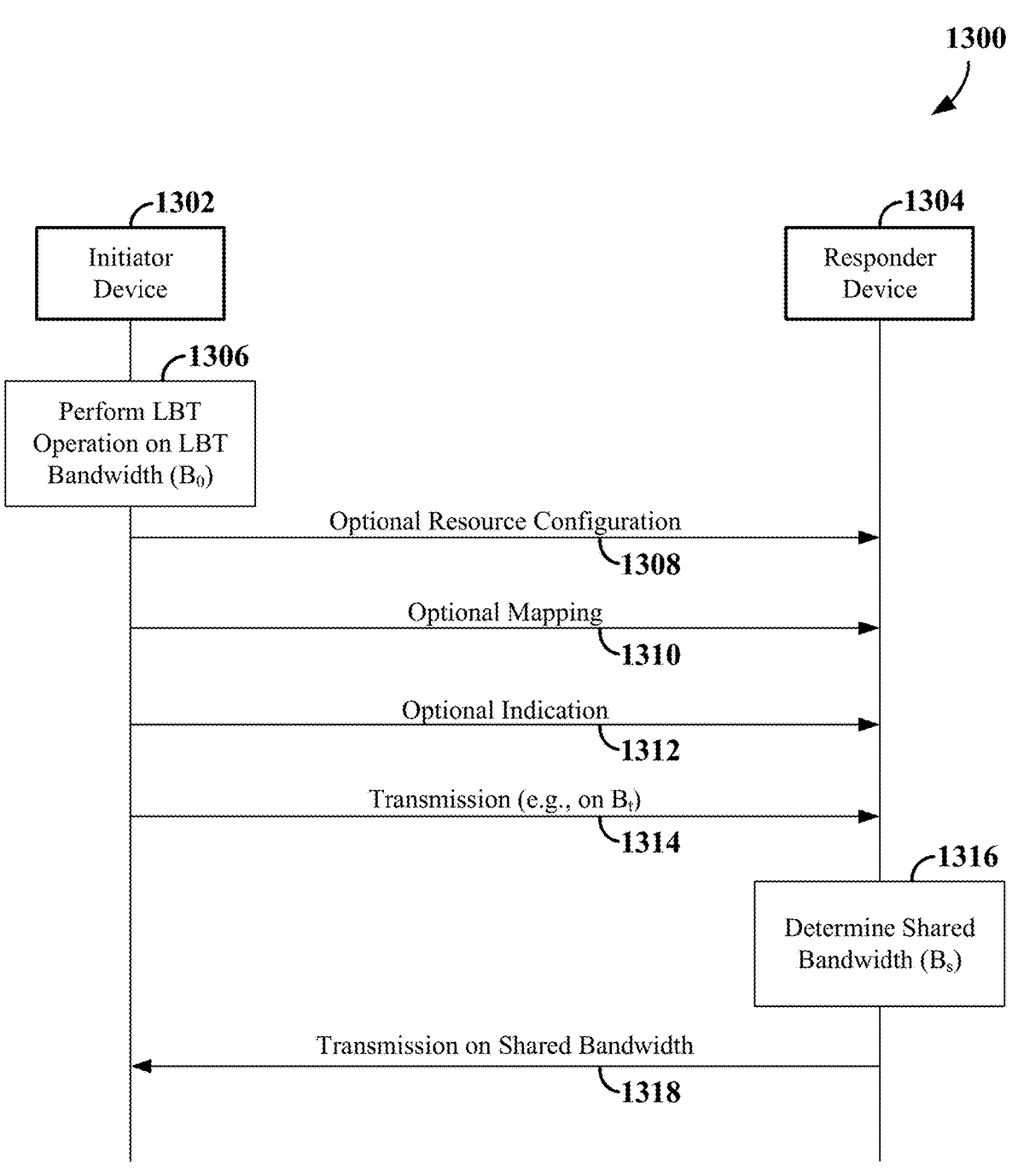
FIG. 13 is a signaling diagram illustrating an example of signaling for COT sharing according to some aspects.

FIG. 13 is a signaling diagram 1300 illustrating an example of COT-related signaling in a wireless communication system including a first wireless communication device (initiator device) 1302 (e.g., a wireless communication device such as a base station or a UE) and a second wireless communication device (responder device) 1304 (e.g., a wireless communication device such as a UE or a base station). In some examples, the first wireless communication device (initiator device) 1302 may correspond to any of the initiator devices or wireless communication devices described in any of FIGS. 6, 8-12, and 15. In some examples, the first wireless communication device (initiator device) 1302 may correspond to any of the network entities, base stations, control units (CUs), distributed units (DUs), radio units (RUs), or scheduling entities shown in any of FIGS. 1, 2, 14, 23, and 25. In some examples, the first wireless communication device (initiator device) 1302 may correspond to any of the UEs or scheduled entities shown in any of FIGS. 1, 2, 14, 21, and 25. In some examples, the second wireless communication device (responder device) 1304 may correspond to any of the responder devices or wireless communication devices described in any of FIGS. 6, 8-12, and 15. In some examples, the second wireless communication device (responder device) 1304 may correspond to any of the network entities, base stations, CUs, DUs, RUs, or scheduling entities shown in any of FIGS. 1, 2, 14, 23, and 25. In some examples, the second wireless communication device (responder device) 1304 may correspond to any of the UEs or scheduled entities shown in any of FIGS. 1, 2, 14, 21, and 25.

At 1306 of FIG. 13, the first wireless communication device (initiator device) 1302 performs an LBT procedure on an LBT bandwidth ($B_0$). Thus, the first wireless communication device (initiator device) 1302 may determine that the LBT bandwidth is available for a particular COT period.

At optional 1308, the first wireless communication device (initiator device) 1302 may transmit resource configuration information for the COT to the second wireless communication device (responder device) 1304. For example, the first wireless communication device (initiator device) 1302 may transmit RB Set configuration information that maps a first set of RBs (e.g., corresponding to the bandwidth $B_t$) to a second set of RBs (e.g., RB Set 1 and RB set 2). In some examples, the second set of RBs includes at least a portion of the first set of RBs.

At optional 1310, the first wireless communication device (initiator device) 1302 may transmit mapping information for the COT to the second wireless communication device (responder device) 1304. For example, the first wireless communication device (initiator device) 1302 may transmit a mapping that maps a transmission bandwidth (e.g., corresponding to the bandwidth $B_t$) to an LBT bandwidth (e.g., corresponding to a bandwidth $B_0'$).

At optional 1312, the first wireless communication device (initiator device) 1302 may transmit an indication for the COT to the second wireless communication device (responder device) 1304. For example, the first wireless communication device (initiator device) 1302 may transmit an indication of the LBT bandwidth (e.g., corresponding to the bandwidth $B_s$) to the second wireless communication device (responder device) 1304. In some examples, this indication may be sent from a base station to a UE via DCI. In some examples, this indication may be sent from a UE to a base station via a CG UCI. In some examples, the indication may be sent in the transmission of 1314.

At 1314, the first wireless communication device (initiator device) 1302 transmits a transmission on a particular bandwidth (e.g., corresponding to the bandwidth $B_t$). For example, a base station may transmit a PDSCH. As another example, a UE may transmit a PUSCH.

At 1316, the second wireless communication device (responder device) 1304 determines a shared bandwidth for the COT (e.g., corresponding to the bandwidth $B_s$). As discussed herein, in some examples, the determination of 1316 may be based on information implicit in the transmission of 1314. Also as discussed herein, in some examples, the determination of 1316 may be based on explicit information in the indication sent at 1312 and/or the transmission of 1314. Also, in some examples, the determination of 1316 may be based on a combination of implicit and explicit bandwidth determination techniques.

At 1318, the second wireless communication device (responder device) 1304 transmits data to the first wireless communication device (initiator device) 1302 on the shared bandwidth (e.g., corresponding to the bandwidth $B_s$) during the COT.

In some examples, when a UE enters a connected state with a base station, the UE obtains CORESET information from the base station via a PBCH, and then obtains the remaining system information from the base station via a PDCCH. For example, a UE may obtain a CORESET configuration via the PBCH that defines and provides the initial DL BWP. In addition, the UE may obtain the initial UL BWP via the PDCCH, as well as UL BWP and DL BWP configurations. The active BWP in any direction can be controlled again via PDCCH. Therefore, information about the BWPs can be maintained at both the UE and the base station from the initial connection, and can be used to determine the shared BW in COT sharing.

Figure 14:
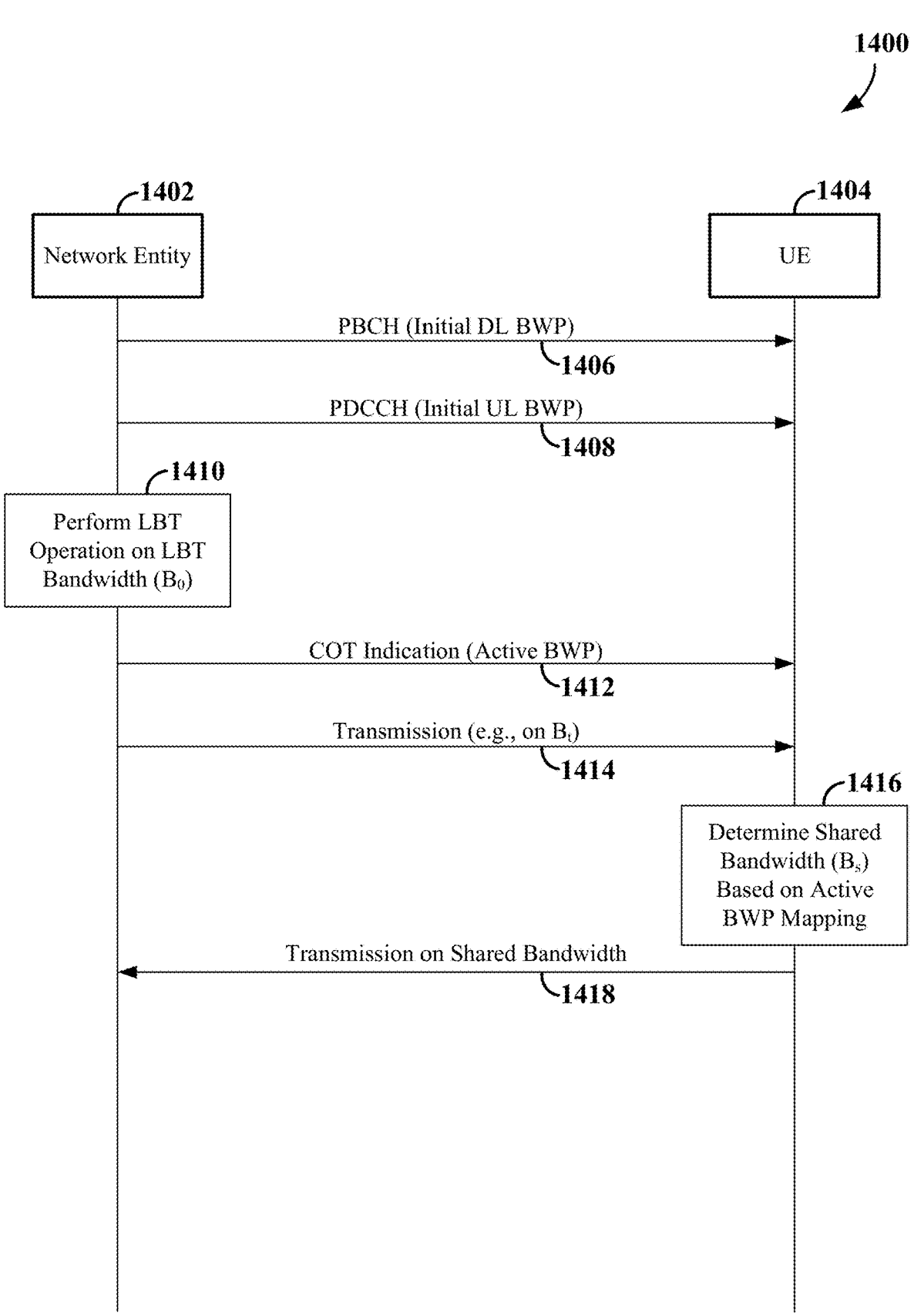
FIG. 14 is a signaling diagram illustrating another example of signaling for COT sharing according to some aspects.

In some examples, a BWP configuration may map an RF BW to an active BWP. For example, a wireless communication device that receives a transmission with a particular BW may identify the shared BW as the active BWP that contain the BW of the received transmission. In some examples, in DL to UL COT sharing, once the UE has received a COT-SI, the UE can determine that there is a base station (e.g., gNB) COT, where the active DL BWP is available for sharing. In some examples, in UL to DL COT sharing, the base station (e.g., gNB) can interpret a UE transmission as a channel acquisition due to a configured grant (CG), and thereby determine that the UE performed an LBT procedure and the active UL BWP is available for sharing FIG. 14 is a signaling diagram 1400 illustrating an example of COT-related signaling in a wireless communication system including a network entity 1402 and a user equipment (UE) 1404. In some examples, the network entity 1402 may correspond to any of the network entities, base stations, CUs, DUs, RUs, or scheduling entities shown in any of FIGS. 1, 2, 23, and 25. In some examples, the network entity 1402 may correspond to any of the initiator devices or wireless communication devices described in any of FIGS. 6, 8-12, and 15. In some examples, the network entity 1402 may correspond to any of the responder devices or wireless communication devices described in any of FIGS. 6, 8-12, and 15. In some examples, the UE 1404 may correspond to any of the UEs or scheduled entities shown in any of FIGS. 1, 2, 21, and 25. In some examples, the UE 1404 may correspond to any of the initiator devices or wireless communication devices described in any of FIGS. 6, 8-12, and 15. In some examples, the UE 1404 may correspond to any of the responder devices or wireless communication devices described in any of FIGS. 6, 8-12, and 15.

At 1406 of FIG. 14, the network entity 1402 transmits a PBCH to the UE 1404. For example, the network entity 1402 may transmit configuration information that indicates the initial DL BWP that will be used by the network entity 1402.

At 1408, the network entity 1402 transmits one or more PDCCHs to the UE 1404. For example, the network entity 1402 may transmit OSI that indicates the initial UL BWP to be used by the UE 1404. In addition, the network entity 1402 may transmit other PDCCHs that indicate other DL BWPs that will be used by the network entity 1402 and/or other UL BWPs to be used by the UE 1404.

At 1410, the network entity 1402 performs an LBT procedure on an LBT bandwidth ($B_0$). Thus, the network entity 1402 may determine that the LBT bandwidth is available for a particular COT period.

At 1412, the network entity 1402 transmits a COT indication to the UE 1404. For example, the network entity 1402 may transmit an indication that a COT is being initiated on a particular set of resources (e.g., a particular BWP).

At 1414, the network entity 1402 transmits a transmission on a particular bandwidth (e.g., corresponding to the bandwidth $B_t$). For example, the network entity 1402 may transmit a PDSCH.

At 1416, the UE 1404 determines a shared bandwidth for the COT (e.g., corresponding to the bandwidth $B_s$). As discussed herein, in some examples, the determination of 1416 may be based on a mapping of the bandwidth $B_t$ to an active DL BWP.

At 1418, the UE 1404 transmits data to the network entity 1402 on the shared bandwidth (e.g., corresponding to the bandwidth $B_s$) during the COT.

Figure 15:
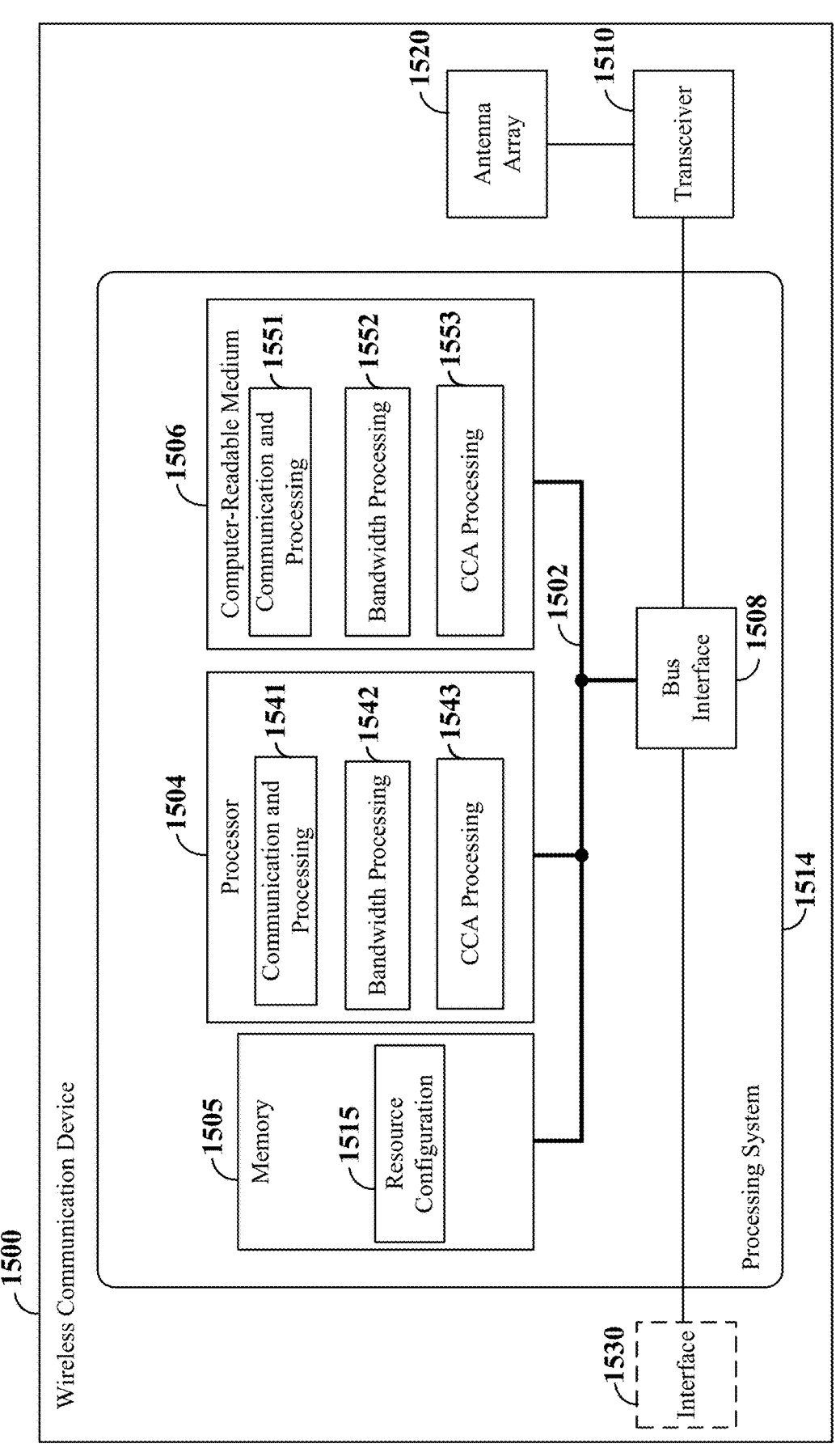
FIG. 15 is a block diagram conceptually illustrating an example of a hardware implementation for a wireless communication device employing a processing system according to some aspects.

FIG. 15 is a block diagram illustrating an example of a hardware implementation for a wireless communication device 1500 employing a processing system 1514. For example, the wireless communication device 1500 may be a device configured to wirelessly communicate with another wireless communication device, as discussed in any one or more of FIGS. 1-14. In some implementations, the wireless communication device 1500 may correspond to any of the wireless communication devices shown in any of FIGS. 1, 2, 6, and 8-13. In some implementations, the wireless communication device 1500 may correspond to any of the UEs or scheduled entities shown in any of FIGS. 1, 2, 14, 21, and 25. In some implementations, the wireless communication device 1500 may correspond to any of the network entities, BSs, CUs, DU, RUs, or scheduling entities shown in any of FIGS. 1, 2, 14, 23, and 25.

In accordance with various aspects of the disclosure, an element, or any portion of an element, or any combination of elements may be implemented with the processing system 1514. The processing system 1514 may include one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1500 may be configured to perform any one or more of the functions described herein. That is, the processor 1504, as utilized in a wireless communication device 1500, may be used to implement any one or more of the processes and procedures described herein.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510 and an antenna array 1520, and between the bus 1502 and an interface 1530. The transceiver 1510 provides a communication interface or means for communicating with various other apparatus over a wireless transmission medium. The interface 1530 provides a communication interface or means of communicating with various other apparatuses and devices (e.g., other devices housed within the same apparatus as the wireless communication device or other external apparatuses) over an internal bus or external transmission medium, such as an Ethernet cable. Depending upon the nature of the wireless communication device 1500, the interface 1530 may include a user interface (e.g., keypad, display, speaker, microphone, joystick). Of course, such a user interface is optional, and may be omitted in some examples, such as an IoT device. Depending upon the nature of the wireless communication device 1500, the interface 1530 may include a network interface that provides a means for communicating with at least one other apparatus within a core network and with at least one radio access network.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software. For example, the memory 1505 may store resource configuration information 1515 (e.g., COT resource information) used by the processor 1504 for communication operations as described herein.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506.

The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The wireless communication device 1500 may be configured to perform any one or more of the operations described herein (e.g., as described above in conjunction with FIGS. 1-14 and as described below in conjunction with FIGS. 16-20). In some aspects of the disclosure, the processor 1504, as utilized in the wireless communication device 1500, may include circuitry configured for various functions.

The processor 1504 may include communication and processing circuitry 1541. The communication and processing circuitry 1541 may be configured to communicate with another wireless communication device (e.g., a base station or a UE). The communication and processing circuitry 1541 may include one or more hardware components that provide the physical structure that performs various processes related to wireless communication (e.g., signal reception and/or signal transmission) as described herein. The communication and processing circuitry 1541 may further include one or more hardware components that provide the physical structure that performs various processes related to signal processing (e.g., processing a received signal and/or processing a signal for transmission) as described herein. In some examples, the communication and processing circuitry 1541 may include two or more transmit/receive chains. The communication and processing circuitry 1541 may further be configured to execute communication and processing software 1551 included on the computer-readable medium 1506 to implement one or more functions described herein.

In some implementations where the communication involves receiving information, the communication and processing circuitry 1541 may obtain information from a component of the wireless communication device 1500 (e.g., from the transceiver 1510 that receives the information via radio frequency signaling or some other type of signaling suitable for the applicable communication medium), process (e.g., decode) the information, and output the processed information. For example, the communication and processing circuitry 1541 may output the information to another component of the processor 1504, to the memory 1505, or to the bus interface 1508. In some examples, the communication and processing circuitry 1541 may receive one or more of signals, messages, other information, or any combination thereof. In some examples, the communication and processing circuitry 1541 may receive information via one or more channels. In some examples, the communication and processing circuitry 1541 may include functionality for a means for receiving. In some examples, the communication and processing circuitry 1541 may include functionality for a means for decoding.

In some implementations where the communication involves sending (e.g., transmitting) information, the communication and processing circuitry 1541 may obtain information (e.g., from another component of the processor 1504, the memory 1505, or the bus interface 1508), process (e.g., encode) the information, and output the processed information. For example, the communication and processing circuitry 1541 may output the information to the transceiver 1510 (e.g., that transmits the information via radio frequency signaling or some other type of signaling suitable for the applicable communication medium). In some examples, the communication and processing circuitry 1541 may send one or more of signals, messages, other information, or any combination thereof. In some examples, the communication and processing circuitry 1541 may send information via one or more channels. In some examples, the communication and processing circuitry 1541 may include functionality for a means for sending (e.g., a means for transmitting). In some examples, the communication and processing circuitry 1541 may include functionality for a means for encoding.

The processor 1504 may include bandwidth processing circuitry 1542 configured to perform bandwidth processing-related operations as discussed herein (e.g., one or more of the operations described in conjunction with FIGS. 4-14). The bandwidth processing circuitry 1542 may be configured to execute bandwidth processing software 1552 included on the computer-readable medium 1506 to implement one or more functions described herein.

In some examples, the bandwidth processing circuitry 1542 may include functionality for a means for transmitting a transmission on a shared bandwidth. For example, the bandwidth processing circuitry 1542 of a responder device may be configured to determine the bandwidth of a received transmission, determine the shared bandwidth for an active COT based on the bandwidth of the received transmission, and initiate a transmission on that shared bandwidth during the active COT (e.g., as described in any of FIGS. 6-14). As another example, the bandwidth processing circuitry 1542 may be configured to process a received message to extract an explicit indication of a shared bandwidth for an active COT, determine the shared bandwidth based on the indication, and initiate a transmission on that shared bandwidth during the active COT (e.g., as described in any of FIGS. 6-14).

In some examples, the bandwidth processing circuitry 1542 may perform the operations described above for the bandwidth determination circuit 612 of FIG. 6. For example, the bandwidth processing circuitry 1542 of a responder device may, based at least in part on a transmission on a bandwidth $B_r$ from an initiator device, determine the shared bandwidth $B_s$ to be used for further transmissions for COT sharing, where $B_s \geq B_r$.

In some examples, the bandwidth processing circuitry 1542 may perform the operations described above for the bandwidth determination circuit 812 of FIG. 8. For example, the bandwidth processing circuitry 1542 of a responder device may, based on a transmission on a bandwidth $B_r$ from an initiator device, determine the shared bandwidth $B_s$ to be used for further transmissions for COT sharing, where $B_s = B_r$.

In some examples, the bandwidth processing circuitry 1542 may perform the operations described above for the bandwidth determination circuit 912 of FIG. 9. For example, the bandwidth processing circuitry 1542 of a responder device may, based on a transmission on a bandwidth $B_r$ from an initiator device and based on an RB set configuration, determine that the shared bandwidth $B_s$ to be used for further transmissions for COT sharing includes a particular set of RB sets. In some examples, the particular set of RB sets includes the RB set(s) of the bandwidth $B_r$ and any other RB set(s) specified by the mapping as being associated with the RB set(s) of the bandwidth $B_r$.

In some examples, the bandwidth processing circuitry 1542 may perform the operations described above for the bandwidth determination circuit 1012 of FIG. 10. For example, the bandwidth processing circuitry 1542 of a responder device may, based on a transmission on a bandwidth $B_r$ from an initiator device and based on bandwidth mapping information, determine that a particular shared bandwidth $B_s$ maps to the bandwidth $B_r$ according to the bandwidth mapping information.

In some examples, the bandwidth processing circuitry 1542 may perform the operations described above for the bandwidth determination circuit 1112 of FIG. 11. For example, the bandwidth processing circuitry 1542 of a responder device may, based on a transmission on a bandwidth $B_r$ from an initiator device, based on an RB set configuration, and based on bandwidth mapping information, determine that the shared bandwidth $B_s$ to be used for further transmissions for COT sharing includes a particular set of RB sets. Here, the particular set of RB sets may include the RB set(s) specified by the mapping as being associated with the bandwidth $B_r$.

In some examples, the bandwidth processing circuitry 1542 may perform the operations described above for the bandwidth determination circuit 1212 of FIG. 12. For example, the bandwidth processing circuitry 1542 of a responder device may, based on a received indication and, optionally, based on the bandwidth $B_r$ of a received transmission, determine the shared bandwidth $B_s$ to be used for further transmissions for COT sharing. For example, the indication may specify a certain shared bandwidth $B_s$ for a certain transmission bandwidth $B_r$.

In some examples, the bandwidth processing circuitry 1542 may include functionality for a means for determining a bandwidth. For example, the bandwidth processing circuitry 1542 of a responder device may be configured to determine the bandwidth of a received transmission and determine the shared bandwidth for a COT based on the bandwidth of the received transmission (e.g., as described in any of FIGS. 6-14). As another example, the bandwidth processing circuitry 1542 may be configured to process a received message to extract an indication of a shared bandwidth for a COT and determine the shared bandwidth based on the indication (e.g., as described in any of FIGS. 6-14).

In some examples, the bandwidth processing circuitry 1542 may include functionality for a means for transmitting a transmission on a bandwidth. For example, the bandwidth processing circuitry 1542 of an initiator device may be configured to select a subset of a CCA bandwidth (e.g., select a bandwidth $B_t$ that is a subset of a bandwidth $B_0$) and initiate a transmission to a responder device on that bandwidth (e.g., as described in any of FIGS. 6-14).

In some examples, the bandwidth processing circuitry 1542 may include functionality for a means for selecting a bandwidth. For example, the bandwidth processing circuitry 1542 of an initiator device may be configured to select a subset of a CCA bandwidth (e.g., select a bandwidth $B_t$ that is a subset of a bandwidth $B_0$) for a transmission to a responder device (e.g., as described in any of FIGS. 6-14). As another example, the bandwidth processing circuitry 1542 of an initiator device may be configured to select a subset of a CCA bandwidth to be used as a shared bandwidth for a COT (e.g., as described in any of FIGS. 6-14).

In some examples, the bandwidth processing circuitry 1542 may include functionality for a means for receiving a transmission on a shared bandwidth. For example, the bandwidth processing circuitry 1542 of an initiator device may be configured may be configured to monitor a bandwidth (e.g., a PDSCH or a PUSCH) that has been designated as a shared bandwidth for a COT (e.g., as described in any of FIGS. 6-14) and process any signals that are received on the shared bandwidth during the COT.

The processor 1504 may include CCA processing circuitry 1543 configured to perform CCA processing-related operations as discussed herein (e.g., one or more of the operations described in conjunction with FIGS. 4-14). The CCA processing circuitry 1543 may be configured to execute CCA processing software 1553 included on the computer-readable medium 1506 to implement one or more functions described herein.

The CCA processing circuitry 1543 may include functionality for a means for conducting a CCA. For example, the CCA processing circuitry 1543 of an initiator device may be configured to select a CCA bandwidth, measure signals on the CCA bandwidth, compare the signal measurements (e.g., measured signal strength) to a detection threshold, and determine whether to use the CCA bandwidth for a transmission based on the comparison (e.g., the corresponding channels may be deemed available if the measured signal strength is less than or equal to the detection threshold).

FIG. 16 is a flow chart illustrating an example wireless communication method 1600 according to some aspects. As described below, some or all illustrated features may be omitted in a particular implementation within the scope of the present disclosure, and some illustrated features may not be required for implementation of all examples. In some examples, the wireless communication method 1600 may be carried out by the wireless communication device 1500 illustrated in FIG. 15. In some examples, the wireless communication method 1600 may be carried out by any suitable apparatus or means for carrying out the functions or algorithm described below.

At block 1602, a first wireless communication device may receive a first transmission on a first radio frequency (RF) bandwidth (BW) from a second wireless communication device, the first RF BW being defined within an unlicensed RF spectrum. In some examples, the communication and processing circuitry 1541 and the transceiver 1510, shown and described in FIG. 15, may provide a means to receive a first transmission on a first radio frequency (RF) bandwidth (BW) from a second wireless communication device.

At block 1604, the first wireless communication device may transmit a second transmission to the second wireless communication device on a first shared BW during a channel occupancy time (COT) associated with the second wireless communication device, the first shared BW including the first RF BW. In some examples, the bandwidth processing circuitry 1542 together with the communication and processing circuitry 1541 and the transceiver 1510, shown and described in FIG. 15, may provide a means to transmit a second transmission to the second wireless communication device on a first shared BW during a channel occupancy time (COT) associated with the second wireless communication device.

In some examples, the first wireless communication device may determine the first shared BW from the first RF BW. In some examples, the first wireless communication device may set the first shared BW equal to the first RF BW. In some examples, the first wireless communication device may identify at least one resource block set from a resource block set configuration based on the first RF BW. In some examples, the resource block set configuration indicates that the at least one resource block set includes at least a portion of the first RF BW. In some examples, the first wireless communication device may set the first shared BW equal to a BW of the at least one resource block set.

In some examples, the first wireless communication device may receive the resource block set configuration from the second wireless communication device. In some examples, the first wireless communication device may receive an indication from the second wireless communication device to activate the resource block set configuration. In some examples, the first wireless communication device may receive a radio resource control (RRC) message that includes the resource block set configuration and receive downlink control information (DCI) that includes the indication.

In some examples, the first wireless communication device may identify the first shared BW based on the first RF BW and a frequency resource mapping. In some examples, the first RF BW may include a first set of resource blocks, and the frequency resource mapping indicates a second set of resource blocks that is mapped to the first set of resource blocks. In some examples, the frequency resource mapping indicates an active uplink bandwidth part including the first RF BW. In some examples, the frequency resource mapping indicates an active downlink bandwidth part including the first RF BW. In some examples, the frequency resource mapping indicates at least one resource block set that is mapped to the first RF BW. In some examples, the frequency resource mapping indicates a CCA BW that is mapped to the first RF BW. In some examples, the first wireless communication device may set the first shared BW equal to the CCA BW. In some examples, the first wireless communication device may receive the frequency resource mapping from the second wireless communication device. In some examples, the first wireless communication device may receive the frequency resource mapping from the second wireless communication device via a radio resource control (RRC) configuration for the first transmission.

In some examples, the first wireless communication device may receive a third transmission on a third RF BW from the second wireless communication device, wherein the third RF BW may include a third set of resource blocks and is defined within the unlicensed RF spectrum. In some examples, the first wireless communication device may determine from the third RF BW and the frequency resource mapping a second shared BW for a second COT associated with the second wireless communication device, wherein the frequency resource mapping indicates a fourth set of resource blocks that is mapped to the third set of resource blocks. In some examples, the first wireless communication device may transmit a fourth transmission to the second wireless communication device on the second shared BW during the second COT.

In some examples, the first wireless communication device may receive an indication that the COT has been initiated. In some examples, the first wireless communication device may determine the first shared BW based on the first RF BW and the indication that the COT has been initiated.

FIG. 17 is a flow chart illustrating an example wireless communication method 1700 according to some aspects. As described below, some or all illustrated features may be omitted in a particular implementation within the scope of the present disclosure, and some illustrated features may not be required for implementation of all examples. In some examples, the wireless communication method 1700 may be carried out by the wireless communication device 1500 illustrated in FIG. 15. In some examples, the wireless communication method 1700 may be carried out by any suitable apparatus or means for carrying out the functions or algorithm described below.

At block 1702, a first wireless communication device may conduct a clear channel assessment (CCA) on a first radio frequency (RF) bandwidth (BW), the first RF BW being defined within an unlicensed RF spectrum. In some examples, the CCA processing circuitry 1543 together with the communication and processing circuitry 1541 and the transceiver 1510, shown and described in FIG. 15, may provide a means to conduct a clear channel assessment (CCA) on a first radio frequency (RF) bandwidth (BW).

At block 1704, the first wireless communication device may transmit a first transmission on a second RF BW to a second wireless communication device, the second RF BW being a proper subset of the first RF BW. In some examples, the bandwidth processing circuitry 1542 together with the communication and processing circuitry 1541 and the transceiver 1510, shown and described in FIG. 15, may provide a means to transmit a first transmission on a second RF BW to a second wireless communication device.

At block 1706, the first wireless communication device may receive a second transmission from the second wireless communication device on a first shared BW during a channel occupancy time (COT) associated with the CCA, the first shared BW being based on the first RF BW and including the second RF BW. In some examples, the bandwidth processing circuitry 1542 together with the communication and processing circuitry 1541 and the transceiver 1510, shown and described in FIG. 15, may provide a means to receive a second transmission from the second wireless communication device on a first shared BW during a channel occupancy time (COT) associated with the CCA.

In some examples, the first wireless communication device may define the second RF BW as a proper subset of the first RF BW. In some examples, the first wireless communication device may define the first shared BW based on the first RF BW and to include the second RF BW. In some examples, the first wireless communication device may transmit an indication that the COT has been initiated.

In some examples, the first wireless communication device may transmit a resource block set configuration to the second wireless communication device. In this case, the resource block set configuration may indicate at least one resource block set that includes at least a portion of the second RF BW. In some examples, the first wireless communication device may transmit an indication to the second wireless communication device to activate the resource block set configuration. In some examples, the first wireless communication device may transmit a radio resource control (RRC) message that includes the resource block set configuration, and transmit downlink control information (DCI) that includes the indication.

In some examples, the first wireless communication device may transmit a frequency resource mapping to the second wireless communication device. In some examples, the second RF BW may include a first set of resource blocks, and the frequency resource mapping indicates a second set of resource blocks that is mapped to the first set of resource blocks. In some examples, the frequency resource mapping indicates an active uplink bandwidth part including the first RF BW. In some examples, the frequency resource mapping indicates an active downlink bandwidth part including the first RF BW. In some examples, the frequency resource mapping indicates at least one resource block set that is mapped to the second RF BW. In some examples, the frequency resource mapping indicates a CCA BW that is mapped to the second RF BW.

Figure 18:
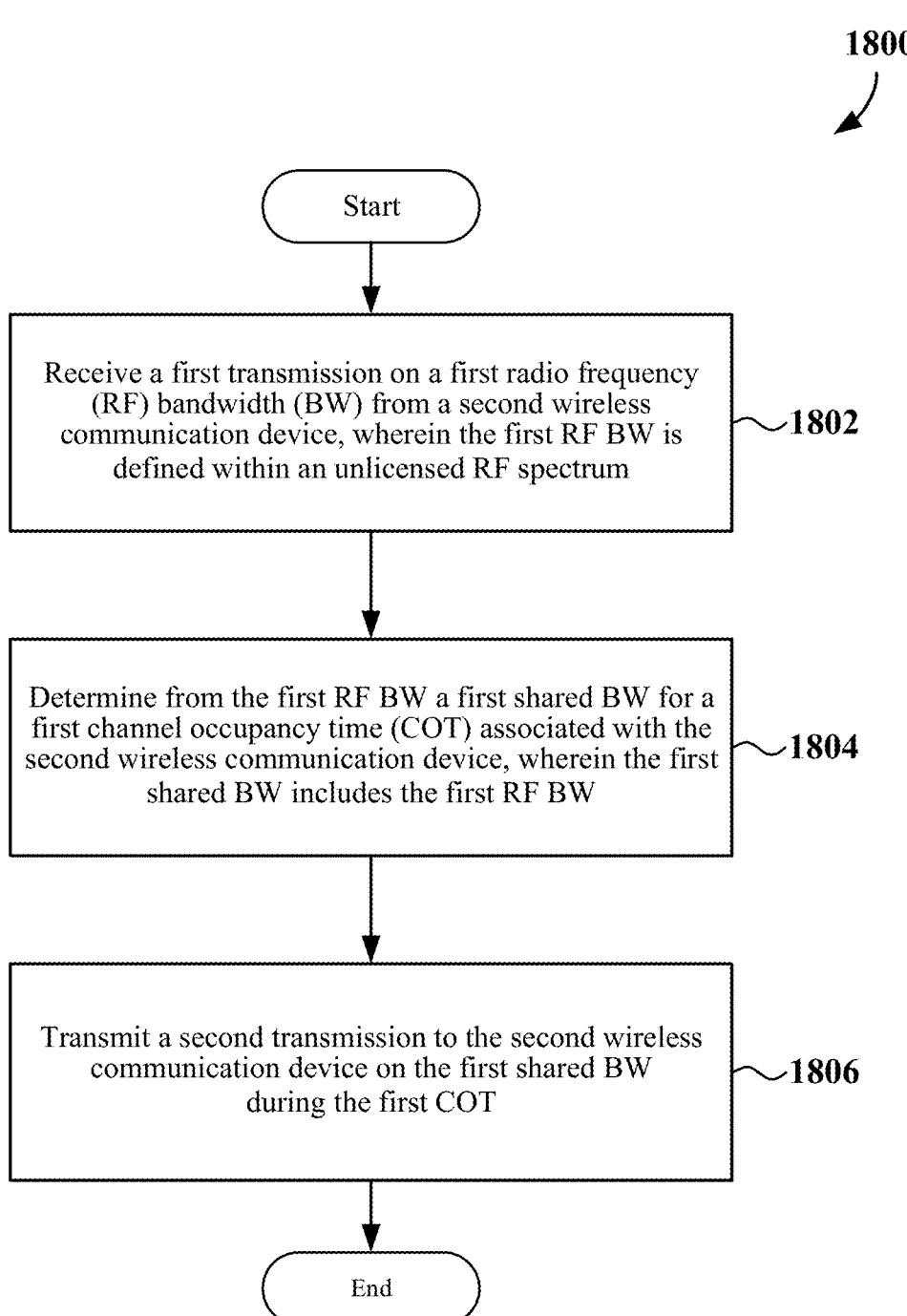
FIG. 18 is a flow chart illustrating an example wireless communication process including determining a shared bandwidth according to some aspects.

FIG. 18 is a flow chart illustrating an example wireless communication method 1800 according to some aspects. As described below, some or all illustrated features may be omitted in a particular implementation within the scope of the present disclosure, and some illustrated features may not be required for implementation of all examples. In some examples, the wireless communication method 1800 may be carried out by the wireless communication device 1500 illustrated in FIG. 15. In some examples, the wireless communication method 1800 may be carried out by any suitable apparatus or means for carrying out the functions or algorithm described below.

At block 1802, a first wireless communication device may receive a first transmission on a first radio frequency (RF) bandwidth (BW) from a second wireless communication device, wherein the first RF BW is defined within an unlicensed RF spectrum. In some examples, the communication and processing circuitry 1541 and the transceiver 1510, shown and described in FIG. 15, may provide a means to receive a first transmission on a first radio frequency (RF) bandwidth (BW) from a second wireless communication device.

At block 1804, the first wireless communication device may determine from the first RF BW a first shared BW for a first channel occupancy time (COT) associated with the second wireless communication device, wherein the first shared BW includes the first RF BW. In some examples, the bandwidth processing circuitry 1542 together with the communication and processing circuitry 1541 and the transceiver 1510, shown and described in FIG. 15, may provide a means to determine from the first RF BW a first shared BW for a first channel occupancy time (COT) associated with the second wireless communication device.

In some examples, to determine the first shared BW from the first RF BW, the first wireless communication device may set the first shared BW equal to the first RF BW. In some examples, to determine the first shared BW from the first RF BW, the first wireless communication device may identify at least one resource block set from a resource block set configuration based on the first RF BW. In some examples, the resource block set configuration indicates that the at least one resource block set includes at least a portion of the first RF BW. In some examples, to identify the at least one resource block set from a resource block set configuration based on the first RF BW, the first wireless communication device may set the first shared BW equal to a BW of the at least one resource block set.

In some examples, the first wireless communication device may receive the resource block set configuration from the second wireless communication device. In some examples, the first wireless communication device may receive a first indication from the second wireless communication device to activate the resource block set configuration. In some examples, the first wireless communication device may receive a radio resource control (RRC) message that includes the resource block set configuration and receive downlink control information (DCI) that includes the first indication.

In some examples, to determine the first shared BW from the first RF BW, the first wireless communication device may identify the first shared BW based on the first RF BW and a frequency resource mapping. In some examples, the first RF BW may include a first set of resource blocks, and the frequency resource mapping indicates a second set of resource blocks that is mapped to the first set of resource blocks. In some examples, the frequency resource mapping indicates at least one resource block set that is mapped to the first RF BW. In some examples, the frequency resource mapping indicates a CCA BW that is mapped to the first RF BW. In some examples, to identify the first shared BW based on the first RF BW and the frequency resource mapping, the first wireless communication device may set the first shared BW equal to the CCA BW. In some examples, the first wireless communication device may receive the frequency resource mapping from the second wireless communication device. In some examples, the first wireless communication device may receive the frequency resource mapping from the second wireless communication device via a radio resource control (RRC) configuration for the first transmission.

At block 1806, the first wireless communication device may transmit a second transmission to the second wireless communication device on the first shared BW during the first COT. In some examples, the communication and processing circuitry 1541 and the transceiver 1510, shown and described in FIG. 15, may provide a means to transmit a second transmission to the second wireless communication device on the first shared BW during the first COT.

In some examples, the first wireless communication device may receive a third transmission on a third RF BW from the second wireless communication device, wherein the third RF BW may include a third set of resource blocks and is defined within the unlicensed RF spectrum. In some examples, the first wireless communication device may determine from the third RF BW and the frequency resource mapping a second shared BW for a second COT associated with the second wireless communication device, wherein the frequency resource mapping indicates a fourth set of resource blocks that is mapped to the third set of resource blocks. In some examples, the first wireless communication device may transmit a fourth transmission to the second wireless communication device on the second shared BW during the second COT.

FIG. 19 is a flow chart illustrating an example wireless communication method 1900 according to some aspects. As described below, some or all illustrated features may be omitted in a particular implementation within the scope of the present disclosure, and some illustrated features may not be required for implementation of all examples. In some examples, the wireless communication method 1900 may be carried out by the wireless communication device 1500 illustrated in FIG. 15. In some examples, the wireless communication method 1900 may be carried out by any suitable apparatus or means for carrying out the functions or algorithm described below.

At block 1902, a first wireless communication device may receive a first transmission on a first radio frequency (RF) bandwidth (BW) from a second wireless communication device, wherein the first RF BW is defined within an unlicensed RF spectrum. In some examples, the communication and processing circuitry 1541 and the transceiver 1510, shown and described in FIG. 15, may provide a means to receive a first transmission on a first radio frequency (RF) bandwidth (BW) from a second wireless communication device. In some examples, the first transmission may include a configured grant uplink control information (CG UCI) transmission.

At block 1904, the first wireless communication device may decode the first transmission to obtain an indication. In some examples, the bandwidth processing circuitry 1542 together with the communication and processing circuitry 1541 and the transceiver 1510, shown and described in FIG. 15, may provide a means to decode the first transmission to obtain an indication. In some examples, the indication specifies the first shared BW.

At block 1906, the first wireless communication device may determine from the indication a first shared BW for a first channel occupancy time (COT) associated with the second wireless communication device. In some examples, the bandwidth processing circuitry 1542, shown and described in FIG. 15, may provide a means to determine from the indication a first shared BW for a first channel occupancy time (COT) associated with the second wireless communication device.

In some examples, the first wireless communication device may determine the first shared BW based on the first RF BW. In some examples, the first wireless communication device may determine the first shared BW based on the first RF BW and a resource block set configuration. In some examples, the first wireless communication device may determine the first shared BW based on the first RF BW and a frequency resource mapping.

At block 1908, the first wireless communication device may transmit a second transmission to the second wireless communication device on the first shared BW during the first COT. In some examples, the communication and processing circuitry 1541 and the transceiver 1510, shown and described in FIG. 15, may provide a means to transmit a second transmission to the second wireless communication device on the first shared BW during the first COT.

Figure 20:
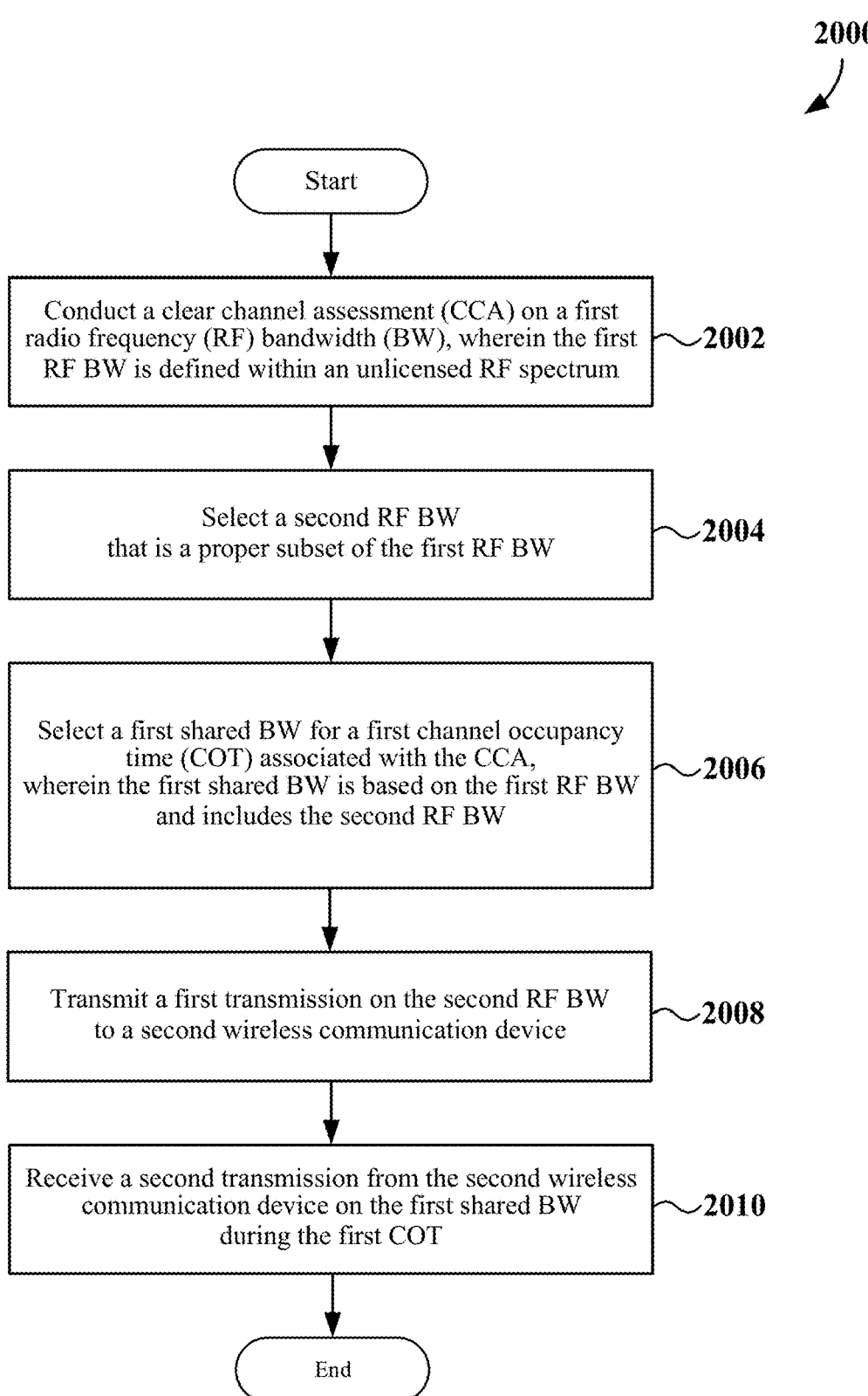
FIG. 20 is a flow chart illustrating an example wireless communication process including selecting a shared bandwidth according to some aspects.

FIG. 20 is a flow chart illustrating an example wireless communication method 2000 according to some aspects. As described below, some or all illustrated features may be omitted in a particular implementation within the scope of the present disclosure, and some illustrated features may not be required for implementation of all examples. In some examples, the wireless communication method 2000 may be carried out by the wireless communication device 1500 illustrated in FIG. 15. In some examples, the wireless communication method 2000 may be carried out by any suitable apparatus or means for carrying out the functions or algorithm described below.

At block 2002, a first wireless communication device may conduct a clear channel assessment (CCA) on a first radio frequency (RF) bandwidth (BW), wherein the first RF BW is defined within an unlicensed RF spectrum. In some examples, the CCA processing circuitry 1543 together with the communication and processing circuitry 1541 and the transceiver 1510, shown and described in FIG. 15, may provide a means to conduct a clear channel assessment (CCA) on a first radio frequency (RF) bandwidth (BW).

At block 2004, the first wireless communication device may select a second RF BW that is a proper subset of the first RF BW. In some examples, the bandwidth processing circuitry 1542, shown and described in FIG. 15, may provide a means to select a second RF BW that is a proper subset of the first RF BW.

At block 2006, the first wireless communication device may select a first shared BW for a first channel occupancy time (COT) associated with the CCA, wherein the first shared BW is based on the first RF BW and includes the second RF BW. In some examples, the bandwidth processing circuitry 1542, shown and described in FIG. 15, may provide a means to select a first shared BW for a first channel occupancy time (COT) associated with the CCA.

At block 2008, the first wireless communication device may transmit a first transmission on the second RF BW to a second wireless communication device. In some examples, the communication and processing circuitry 1541 and the transceiver 1510, shown and described in FIG. 15, may provide a means to transmit a first transmission on the second RF BW to a second wireless communication device. In some examples, the first transmission may include an indication of the first shared BW.

At block 2010, the first wireless communication device may receive a second transmission from the second wireless communication device on the first shared BW during the first COT. In some examples, the communication and processing circuitry 1541 and the transceiver 1510, shown and described in FIG. 15, may provide a means to receive a second transmission from the second wireless communication device on the first shared BW during the first COT.

In some examples, the first wireless communication device may transmit a resource block set configuration to the second wireless communication device. In this case, the resource block set configuration may indicate at least one resource block set that includes at least a portion of the second RF BW. In some examples, the first wireless communication device may transmit a first indication to the second wireless communication device to activate the resource block set configuration. In some examples, the first wireless communication device may transmit a radio resource control (RRC) message that includes the resource block set configuration, and transmit downlink control information (DCI) that includes the first indication.

In some examples, the first wireless communication device may transmit a frequency resource mapping to the second wireless communication device. In some examples, the second RF BW may include a first set of resource blocks, and the frequency resource mapping indicates a second set of resource blocks that is mapped to the first set of resource blocks. In some examples, the frequency resource mapping indicates at least one resource block set that is mapped to the second RF BW. In some examples, the frequency resource mapping indicates a CCA BW that is mapped to the second RF BW.

In one configuration, the wireless communication device 1500 includes means for receiving a first transmission on a first radio frequency (RF) bandwidth (BW) from a second wireless communication device, the first RF BW being defined within an unlicensed RF spectrum, and means for transmitting a second transmission to the second wireless communication device on a first shared BW during a first channel occupancy time (COT) associated with the second wireless communication device, the first shared BW including the first RF BW. In one configuration, the wireless communication device 1500 includes means for conducting a clear channel assessment (CCA) on a first radio frequency (RF) bandwidth (BW), wherein the first RF BW is defined within an unlicensed RF spectrum, means for transmitting a first transmission on a second RF BW to a second wireless communication device, the second RF BW being a proper subset of the first RF BW, and means for receiving a second transmission from the second wireless communication device on a first shared BW during a first channel occupancy time (COT) associated with the CCA, the first shared BW being based on the first RF BW and including the second RF BW. In one aspect, the aforementioned means may be the processor 1504 shown in FIG. 15 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable medium 1506, or any other suitable apparatus or means described in any one or more of FIGS. 1, 2, 6-13, 14, 15, 21, 22, and 25 and utilizing, for example, the methods and/or algorithms described herein in relation to FIGS. 16-20.

Figure 21:
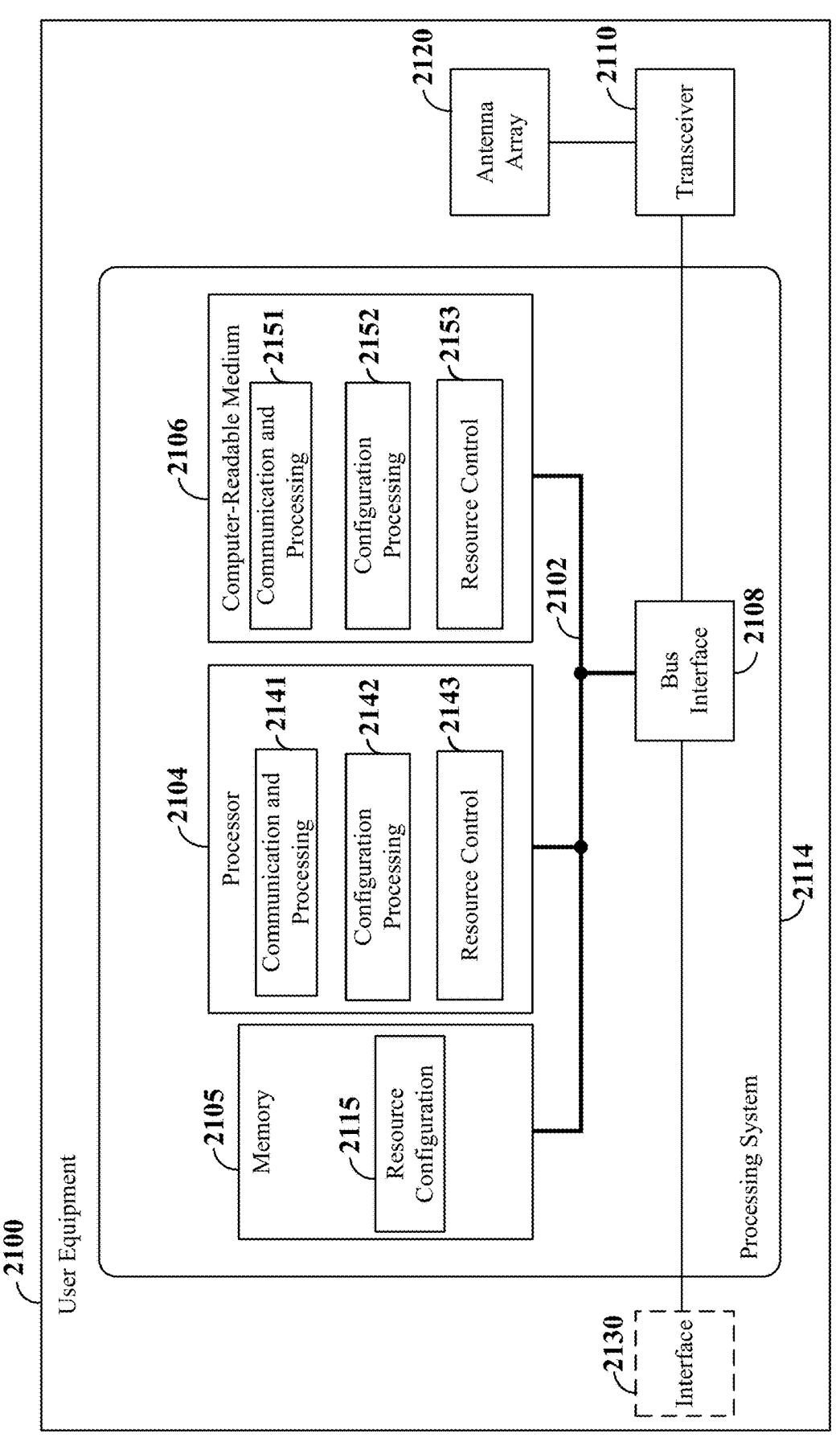
FIG. 21 is a block diagram conceptually illustrating an example of a hardware implementation for a user equipment employing a processing system according to some aspects.

FIG. 21 is a block diagram illustrating an example of a hardware implementation for a UE 2100 employing a processing system 2114. For example, the UE 2100 may be a device configured to wirelessly communicate with a base station, as discussed in any one or more of FIGS. 1-14. In some implementations, the UE 2100 may correspond to any of the UEs or scheduled entities shown in any of FIGS. 1, 2, 14, and 25. In some implementations, the UE 2100 may correspond to any of the wireless communication devices shown in any of FIGS. 1, 2, 6, and 8-13.

In accordance with various aspects of the disclosure, an element, or any portion of an element, or any combination of elements may be implemented with the processing system 2114. The processing system may include one or more processors 2104. The processing system 2114 may be substantially the same as the processing system 1514 illustrated in FIG. 15, including a bus interface 2108, a bus 2102, memory 2105, a processor 2104, a computer-readable medium 2106, a transceiver 2110, and an antenna array 2120. The memory 2105 may store resource configuration information 2115 (e.g., COT resource information) used by the processor 2104 for communication operations as discussed herein. Depending upon the nature of the apparatus, the interface 2130 may include a user interface (e.g., keypad, display, speaker, microphone, joystick). Of course, such a user interface is optional, and may be omitted in some examples, such as an IoT device.

The UE 2100 may be configured to perform any one or more of the operations described herein (e.g., as described above in conjunction with FIGS. 1-14 and as described below in conjunction with FIG. 22). In some aspects of the disclosure, the processor 2104, as utilized in the UE 2100, may include circuitry configured for various functions.

The processor 2104 may in some instances be implemented via a baseband or modem chip and in other implementations, the processor 2104 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In some aspects of the disclosure, the processor 2104 may include communication and processing circuitry 2141. The communication and processing circuitry 2144 may be configured to communicate with a UE. The communication and processing circuitry 2141 may include one or more hardware components that provide the physical structure that performs various processes related to communication (e.g., signal reception and/or signal transmission) as described herein. The communication and processing circuitry 2141 may further include one or more hardware components that provide the physical structure that performs various processes related to signal processing (e.g., processing a received signal and/or processing a signal for transmission) as described herein. The communication and processing circuitry 2141 may further be configured to execute communication and processing software 2151 included on the computer-readable medium 2106 to implement one or more functions described herein.

The communication and processing circuitry 2141 may further be configured to transmit a message to a UE and/or receive a message from a UE. For example, a downlink message be included in a MAC-CE carried in a PDSCH, DCI carried in a PDCCH or PDSCH, or an RRC message. In addition, an uplink message be included in a MAC-CE carried in a PUSCH, UCI carried in a PUCCH, a random access message, or an RRC message.

In some implementations wherein the communication involves receiving information, the communication and processing circuitry 2141 may obtain information from a component of the UE 2100 (e.g., from the transceiver 2110 that receives the information via radio frequency signaling or some other type of signaling suitable for the applicable communication medium), process (e.g., decode) the information, and output the processed information. For example, the communication and processing circuitry 2141 may output the information to another component of the processor 2104, to the memory 2105, or to the bus interface 2108. In some examples, the communication and processing circuitry 2141 may receive one or more of signals, messages, other information, or any combination thereof. In some examples, the communication and processing circuitry 2141 may receive information via one or more channels. In some examples, the communication and processing circuitry 2141 may include functionality for a means for receiving. In some examples, the communication and processing circuitry 2141 may include functionality for a means for decoding.

In some implementations wherein the communication involves sending (e.g., transmitting) information, the communication and processing circuitry 2141 may obtain information (e.g., from another component of the processor 2104, the memory 2105, or the bus interface 2108), process (e.g., encode) the information, and output the processed information. For example, the communication and processing circuitry 2141 may output the information to the transceiver 2110 (e.g., that transmits the information via radio frequency signaling or some other type of signaling suitable for the applicable communication medium). In some examples, the communication and processing circuitry 2141 may send one or more of signals, messages, other information, or any combination thereof. In some examples, the communication and processing circuitry 2141 may send information via one or more channels. In some examples, the communication and processing circuitry 2141 may include functionality for a means for sending (e.g., a means for transmitting). In some examples, the communication and processing circuitry 2141 may include functionality for a means for encoding.

The processor 2104 may include configuration processing circuitry 2142 configured to perform configuration process-ing-related operations as discussed herein (e.g., one or more of the operations described in conjunction with FIGS. 4-14). The configuration processing circuitry 2142 may include functionality for a means for receiving an indication of a resource block configuration. The configuration processing circuitry 2142 may be configured to execute configuration processing software 2152 included on the computer-read-able medium 2106 to implement one or more functions described herein.

The processor 2104 may include resource control cir-cuitry 2143 configured to perform resource control-related operations as discussed herein (e.g., one or more of the operations described in conjunction with FIGS. 4-14). The resource control circuitry 2143 may include functionality for a means for receiving an indication to activate a resource block set configuration. The resource control circuitry 2143 may be configured to execute resource control software 2153 included on the computer-readable medium 2106 to implement one or more functions described herein.

FIG. 22 is a flow chart illustrating an example wireless communication method 2200 according to some aspects. As described below, some or all illustrated features may be omitted in a particular implementation within the scope of the present disclosure, and some illustrated features may not be required for implementation of all examples. In some examples, the wireless communication method 2200 may be carried out by the UE 2100 illustrated in FIG. 21. In some examples, the wireless communication method 2200 may be carried out by any suitable apparatus or means for carrying out the functions or algorithm described below.

At block 2202, a user equipment may receive a first indication of a resource block set configuration from a base station. In some examples, the configuration processing circuitry 2142 together with the communication and pro-cessing circuitry 2141 and the transceiver 2110, shown and described in FIG. 21, may provide a means to receive a first indication of a resource block set configuration from a base station.

At block 2204, the user equipment may receive a second indication from the base station to activate the resource block set configuration after the receiving the first indica-tion. In some examples, the resource control circuitry 2193 together with the communication and processing circuitry 1841 and the transceiver 2110, shown and described in FIG. 21, may provide a means to receive a second indication from the base station to activate the resource block set configu-ration after the receiving the first indication.

At block 2206, the user equipment may communicate with the base station via at least one resource block indicated by the resource block set configuration after the receiving the second indication. In some examples, the communica-tion and processing circuitry 2141 and the transceiver 2110, shown and described in FIG. 21, may provide a means to communicate with the base station via at least one resource block indicated by the resource block set configuration after the receiving the second indication.

In some examples, the at least one resource block may include at least one of a first set of resource blocks for downlink communication, a second set of resource blocks for uplink communication, a third set of resource blocks for channel occupancy time (COT) communication, or a com-bination thereof.

In some examples, the user equipment may, prior to receiving the first indication, transmit a request to the base station for a first resource block set configuration for an uplink transmission. In this case, the resource block set configuration may include the first resource block set con-figuration for the uplink transmission.

In some examples, the user equipment may receive a third indication from the base station to deactivate the resource block set configuration after the communicating with the base station.

In some examples, the user equipment may receive a radio resource control (RRC) message that includes the first indication. In some examples, the user equipment may receive downlink control information (DCI) that includes the first indication.

In one configuration, the UE 2100 includes means for receiving a first indication of a resource block set configu-ration from a base station, means for receiving a second indication from the base station to activate the resource block set configuration after the receiving the first indica-tion, and means for communicating with the base station via at least one resource block indicated by the resource block set configuration after the receiving the second indication. In one aspect, the aforementioned means may be the processor 2104 shown in FIG. 21 configured to perform the functions recited by the aforementioned means (e.g., as discussed above). In another aspect, the aforementioned means may be a circuit or any apparatus configured to perform the func-tions recited by the aforementioned means.

Of course, in the above examples, the circuitry included in the processor 2104 is merely provided as an example, and other means for carrying out the described functions may be included within various aspects of the present disclosure, including but not limited to the instructions stored in the computer-readable medium 2106, or any other suitable apparatus or means described in any one or more of FIGS. 1, 2, 6-14, 21, and 25, and utilizing, for example, the methods and/or algorithms described herein in relation to FIG. 22.

Figure 23:
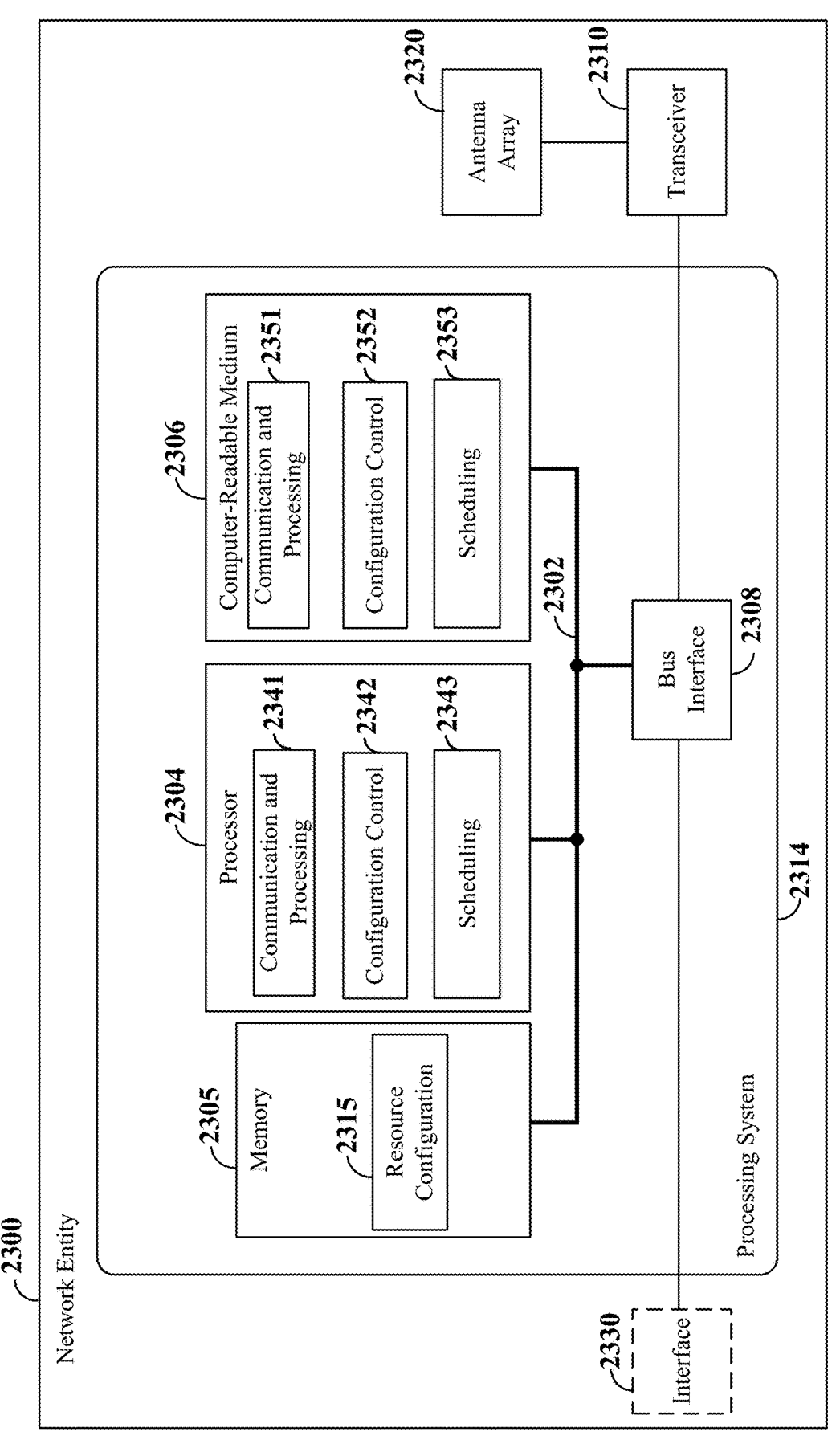
FIG. 23 is a block diagram conceptually illustrating an example of a hardware implementation for a network entity employing a processing system according to some aspects.

FIG. 23 is a conceptual diagram illustrating an example of a hardware implementation for network entity 2300 employ-ing a processing system 2314. In some implementations, the network entity 2300 may correspond to any of the network entities, BSs (e.g., gNBs), CUs, DUs, RUs, or scheduling entities shown in any of FIGS. 1, 2, 14, and 25. In some implementations, the network entity 2300 may correspond to any of the wireless communication devices shown in any of FIGS. 1, 2, 6, and 8-13.

In accordance with various aspects of the disclosure, an element, or any portion of an element, or any combination of elements may be implemented with the processing system 2314. The processing system may include one or more processors 2304. The processing system 2314 may be sub-stantially the same as the processing system 1514 illustrated in FIG. 15, including a bus interface 2308, a bus 2302, memory 2305, a processor 2304, a computer-readable medium 2306, a transceiver 2310, and an antenna array 2320. The memory 2305 may store resource configuration information 2315 (e.g., COT resource information) used by the processor 2304 for communication operations as dis-cussed herein. Furthermore, the network entity 2300 may include an interface 2330 (e.g., a network interface) that provides a means for communicating with at least one other apparatus within a core network and with at least one radio access network.

The network entity 2300 may be configured to perform any one or more of the operations described herein (e.g., as described above in conjunction with FIGS. 1-14 and as described below in conjunction with FIG. 24). In some aspects of the disclosure, the processor 2304, as utilized in the network entity 2300, may include circuitry configured for various functions.

The processor 2304 may be configured to generate, schedule, and modify a resource assignment or grant of time-frequency resources (e.g., a set of one or more resource elements). For example, the processor 2304 may schedule time-frequency resources within a plurality of time division duplex (TDD) and/or frequency division duplex (FDD) subframes, slots, and/or mini-slots to carry user data traffic and/or control information to and/or from multiple UEs. The processor 2304 may be configured to schedule resources for the transmission of downlink signals and/or resources for the transmission of uplink signals.

In some aspects of the disclosure, the processor 2304 may include communication and processing circuitry 2341. The communication and processing circuitry 2344 may be configured to communicate with a UE. The communication and processing circuitry 2341 may include one or more hardware components that provide the physical structure that performs various processes related to communication (e.g., signal reception and/or signal transmission) as described herein. The communication and processing circuitry 2341 may further include one or more hardware components that provide the physical structure that performs various processes related to signal processing (e.g., processing a received signal and/or processing a signal for transmission) as described herein. The communication and processing circuitry 2341 may further be configured to execute communication and processing software 2351 included on the computer-readable medium 2306 to implement one or more functions described herein.

The communication and processing circuitry 2341 may further be configured to transmit a message to a UE and/or receive a message from a UE. For example, a downlink message be included in a MAC-CE carried in a PDSCH, DCI carried in a PDCCH or PDSCH, or an RRC message. In addition, an uplink message be included in a MAC-CE carried in a PUSCH, UCI carried in a PUCCH, a random access message, or an RRC message.

In some implementations wherein the communication involves receiving information, the communication and processing circuitry 2341 may obtain information from a component of the network entity 2300 (e.g., from the transceiver 2310 that receives the information via radio frequency signaling or some other type of signaling suitable for the applicable communication medium), process (e.g., decode) the information, and output the processed information. For example, the communication and processing circuitry 2341 may output the information to another component of the processor 2304, to the memory 2305, or to the bus interface 2308. In some examples, the communication and processing circuitry 2341 may receive one or more of signals, messages, other information, or any combination thereof. In some examples, the communication and processing circuitry 2341 may receive information via one or more channels. In some examples, the communication and processing circuitry 2341 may include functionality for a means for receiving. In some examples, the communication and processing circuitry 2341 may include functionality for a means for decoding.

In some implementations wherein the communication involves sending (e.g., transmitting) information, the communication and processing circuitry 2341 may obtain information (e.g., from another component of the processor 2304, the memory 2305, or the bus interface 2308), process (e.g., encode) the information, and output the processed information. For example, the communication and processing circuitry 2341 may output the information to the transceiver 2310 (e.g., that transmits the information via radio frequency signaling or some other type of signaling suitable for the applicable communication medium). In some examples, the communication and processing circuitry 2341 may send one or more of signals, messages, other information, or any combination thereof. In some examples, the communication and processing circuitry 2341 may send information via one or more channels. In some examples, the communication and processing circuitry 2341 may include functionality for a means for sending (e.g., a means for transmitting). In some examples, the communication and processing circuitry 2341 may include functionality for a means for encoding.

The processor 2304 may include configuration control circuitry 2342 configured to perform configuration control-related operations as discussed herein (e.g., one or more of the operations described in conjunction with FIGS. 4-14). The configuration control circuitry 2342 may include functionality for a means for transmitting an indication of a resource block configuration. For example, the configuration control circuitry 2342 may be configured to select a resource block configuration for a UE and transmit an indication of this configuration on a PDCCH or a PDSCH. The configuration control circuitry 2342 may be configured to execute configuration control software 2352 included on the computer-readable medium 2306 to implement one or more functions described herein.

The processor 2304 may include scheduling circuitry 2343 configured to perform scheduling-related operations as discussed herein (e.g., one or more of the operations described in conjunction with FIGS. 4-14). The scheduling circuitry 2343 may include functionality for a means for transmitting an indication to activate a resource block set configuration. For example, the scheduling circuitry 2343 may be configured to generate a DCI including an RB set configuration activation field and transmit the DCI to a UE on a PDCCH. The scheduling circuitry 2343 may be configured to execute scheduling software 2353 included on the computer-readable medium 2306 to implement one or more functions described herein.

In some examples, the network entity 2300 shown and described above in connection with FIG. 23 may be a disaggregated base station (e.g., as described below in conjunction with FIG. 25). For example, the network entity 2300 shown in FIG. 23 may include the CU and optionally one or more DUs/RUs of the disaggregated base station. Other DUs/RUs associated with the network entity 2300 may be distributed throughout the network. In some examples, the DUs/RUs may correspond to TRPs associated with the network entity. In some examples, the CU and/or DU/RU of the disaggregated base station (e.g., within the network entity 2300) may provide to a user equipment an indication of an RB set configuration and an indication to activate the RB set configuration, and communicate with the user equipment via at least one RB indicated by the RB set configuration.

Figure 24:
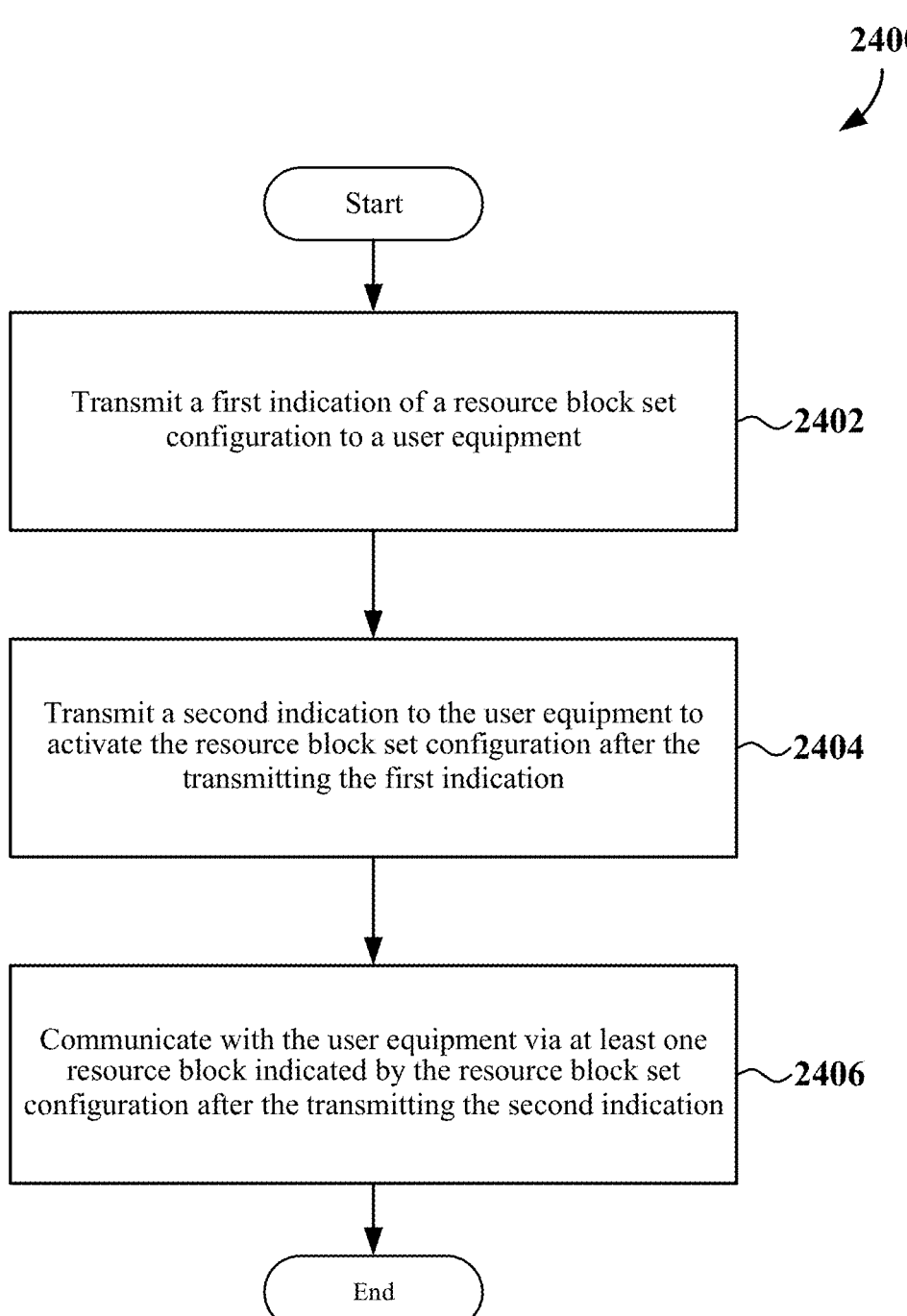
FIG. 24 is a flow chart illustrating an example wireless communication process for activating a resource block set configuration according to some aspects.

FIG. 24 is a flow chart illustrating an example wireless communication method 2400 according to some aspects. As described below, some or all illustrated features may be omitted in a particular implementation within the scope of the present disclosure, and some illustrated features may not be required for implementation of all examples. In some examples, the wireless communication method 2400 may be carried out by the network entity 2300 illustrated in FIG. 23. In some examples, the wireless communication method 2400 may be carried out by any suitable apparatus or means for carrying out the functions or algorithm described below.

At block 2402, a base station may transmit a first indication of a resource block set configuration to a user equipment. In some examples, the configuration control circuitry 2342 together with the communication and processing circuitry 2341 and the transceiver 2310, shown and described in FIG. 23, may provide a means to transmit a first indication of a resource block set configuration to a user equipment.

At block 2404, the base station may transmit a second indication to the user equipment to activate the resource block set configuration after the transmitting the first indication. In some examples, the scheduling circuitry 2343 together with the communication and processing circuitry 2341 and the transceiver 2310, shown and described in FIG. 23, may provide a means to transmit a second indication to the user equipment to activate the resource block set configuration after the transmitting the first indication.

At block 2406, the base station may communicate with the user equipment via at least one resource block indicated by the resource block set configuration after the transmitting the second indication. In some examples, the communication and processing circuitry 2341 and the transceiver 2310, shown and described in FIG. 23, may provide a means to communicate with the user equipment via at least one resource block indicated by the resource block set configuration after the transmitting the second indication.

In some examples, the at least one resource block may include at least one of a first set of resource blocks for downlink communication, a second set of resource blocks for uplink communication, a third set of resource blocks for channel occupancy time (COT) communication, or a combination thereof.

In some examples, the base station may receive a request from the user equipment for a first resource block set configuration for an uplink transmission, and generate the resource block set configuration to include the first resource block set configuration for the uplink transmission.

In some examples, the base station may transmit a third indication to the user equipment to deactivate the resource block set configuration after the communicating with the user equipment.

In some examples, the base station may transmit a radio resource control (RRC) message that includes the first indication, and transmit downlink control information (DCI) that includes the first indication.

In one configuration, the network entity 2300 includes means for transmitting a first indication of a resource block set configuration to a user equipment, means for transmitting a second indication to the user equipment to activate the resource block set configuration after the transmitting the first indication, and means for communicating with the user equipment via at least one resource block indicated by the resource block set configuration after the transmitting the second indication. In one aspect, the aforementioned means may be the processor 2304 shown in FIG. 23 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 2304 is merely provided as an example, and other means for carrying out the described functions may be included within various aspects of the present disclosure, including but not limited to the instructions stored in the computer-readable medium 2306, or any other suitable apparatus or means described in any one or more of FIGS. 1, 2, 6-14, 22, and 25, and utilizing, for example, the methods and/or algorithms described herein in relation to FIG. 24.

The methods shown in FIGS. 16-20, 22, and 24 may include additional aspects, such as any single aspect or any combination of aspects described below and/or in connection with one or more other processes described elsewhere herein.

Figure 25:
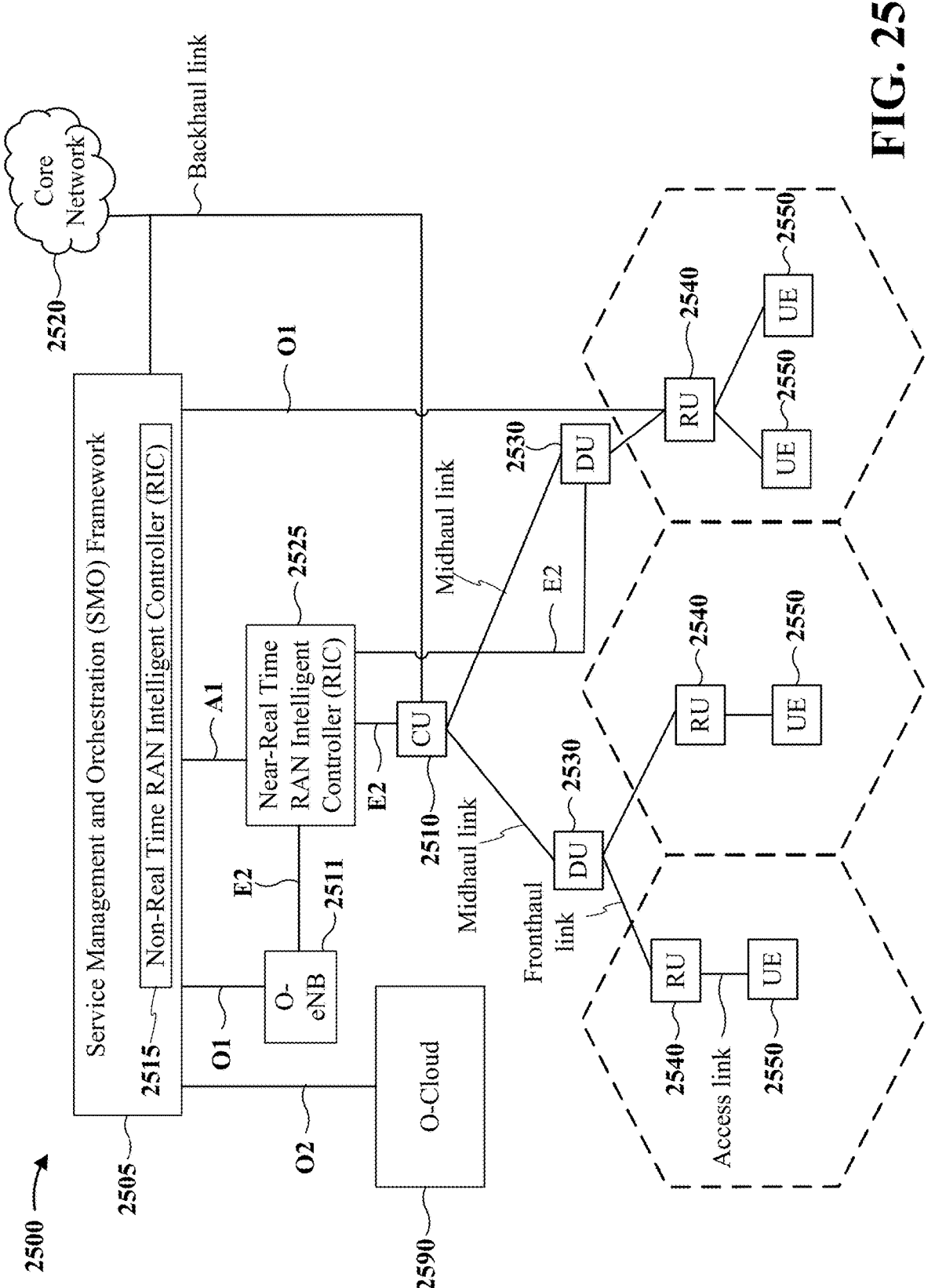
FIG. 25 is a diagram providing a high-level illustration of one example of a configuration of a disaggregated base station according to some aspects.

FIG. 25 shows a diagram illustrating an example disaggregated base station 2500 architecture. The disaggregated base station 2500 architecture may include one or more central units (CUs) 2510 that can communicate directly with a core network 2520 via a backhaul link, or indirectly with the core network 2520 through one or more disaggregated base station units (such as a Near-Real Time (Near-RT) RAN Intelligent Controller (RIC) 2525 via an E2 link, or a Non-Real Time (Non-RT) RIC 2515 associated with a Service Management and Orchestration (SMO) Framework 2505, or both). A CU 2510 may communicate with one or more distributed units (DUs) 2530 via respective midhaul links, such as an F1 interface. The DUs 2530 may communicate with one or more radio units (RUs) 2540 via respective fronthaul links. The RUs 2540 may communicate with respective UEs 2550 via one or more radio frequency (RF) access links. In some implementations, the UE 2550 may be simultaneously served by multiple RUs 2540.

Each of the units, i.e., the CUs 2510, the DUs 2530, the RUs 2540, as well as the Near-RT RICs 2525, the Non-RT RICs 2515 and the SMO Framework 2505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 2510 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 2510. The CU 2510 may be configured to handle user plane functionality (i.e., Central Unit-User Plane (CU-UP)), control plane functionality (i.e., Central Unit-Control Plane (CU-CP)), or a combination thereof. In some implementations, the CU 2510 can be logically split into one or more CU-UP units and one or more CU-CP units. The CU-UP unit can communicate bidirectionally with the CU-CP unit via an interface, such as the E1 interface when implemented in an O-RAN configuration. The CU 2510 can be implemented to communicate with the distributed unit (DU) 2530, as necessary, for network control and signaling.

The DU 2530 may correspond to a logical unit that includes one or more base station functions to control the operation of one or more RUs 2540. In some aspects, the DU 2530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 2530 may further host one or more low PHY layers. Each layer (or module) can be implemented with an interface configured to communicate signals with other layers (and modules) hosted by the DU 2530, or with the control functions hosted by the CU 2510.

Lower-layer functionality can be implemented by one or more RUs 2540. In some deployments, an RU 2540, controlled by a DU 2530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 2540 can be implemented to handle over the air (OTA) communication with one or more UEs 2550. In some implementations, real-time and non-real-time aspects of control and user plane communication with the RU(s) 2540 can be controlled by the corresponding DU 2530. In some scenarios, this configuration can enable the DU(s) 2530 and the CU 2510 to be implemented in a cloud-based RAN architecture, such as a vRAN architecture.

The SMO Framework 2505 may be configured to support RAN deployment and provisioning of non-virtualized and virtualized network elements. For non-virtualized network elements, the SMO Framework 2505 may be configured to support the deployment of dedicated physical resources for RAN coverage requirements which may be managed via an operations and maintenance interface (such as an O1 interface). For virtualized network elements, the SMO Framework 2505 may be configured to interact with a cloud computing platform (such as an open cloud (O-Cloud) 2590) to perform network element life cycle management (such as to instantiate virtualized network elements) via a cloud computing platform interface (such as an O2 interface). Such virtualized network elements can include, but are not limited to, CUs 2510, DUs 2530, RUs 2540 and Near-RT RICs 2525. In some implementations, the SMO Framework 2505 can communicate with a hardware aspect of a 4G RAN, such as an open eNB (O-eNB) 2511, via an O1 interface. Additionally, in some implementations, the SMO Framework 2505 can communicate directly with one or more RUs 2540 via an O1 interface. The SMO Framework 2505 also may include a Non-RT RIC 2515 configured to support functionality of the SMO Framework 2505.

The Non-RT RIC 2515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 2525. The Non-RT RIC 2515 may be coupled to or communicate with (such as via an A1 interface) the Near-RT RIC 2525. The Near-RT RIC 2525 may be configured to include a logical function that enables near-real-time control and optimization of RAN elements and resources via data collection and actions over an interface (such as via an E2 interface) connecting one or more CUs 2510, one or more DUs 2530, or both, as well as an O-eNB, with the Near-RT RIC 2525.

In some implementations, to generate AI/ML models to be deployed in the Near-RT RIC 2525, the Non-RT RIC 2515 may receive parameters or external enrichment information from external servers. Such information may be utilized by the Near-RT RIC 2525 and may be received at the SMO Framework 2505 or the Non-RT RIC 2515 from non-network data sources or from network functions. In some examples, the Non-RT RIC 2515 or the Near-RT RIC 2525 may be configured to tune RAN behavior or performance. For example, the Non-RT RIC 2515 may monitor long-term trends and patterns for performance and employ AI/ML models to perform corrective actions through the SMO Framework 2505 (such as reconfiguration via O1) or via creation of RAN management policies (such as A1 policies).

In some examples, a method for wireless communication at a wireless communication device is disclosed. The method may include receiving a first transmission on a first radio frequency (RF) bandwidth (BW) from a second wireless communication device, determining from the first RF BW a first shared BW for a first channel occupancy time (COT) associated with the second wireless communication device, and transmitting a second transmission to the second wireless communication device on the first shared BW during the first COT. In some examples, the first RF BW is defined within an unlicensed RF spectrum and the first shared BW includes the first RF BW.

In some examples, a wireless communication device may include a transceiver, a memory, and a processor coupled to the transceiver and the memory. The processor and the memory may be configured to receive a first transmission on a first radio frequency (RF) bandwidth (BW) from a second wireless communication device via the transceiver, determine from the first RF BW a first shared BW for a first channel occupancy time (COT) associated with the second wireless communication device, and transmit a second transmission to the second wireless communication device on the first shared BW during the first COT via the transceiver. In some examples, the first RF BW is defined within an unlicensed RF spectrum and the first shared BW includes the first RF BW.

In some examples, a wireless communication device may include means for receiving a first transmission on a first radio frequency (RF) bandwidth (BW) from a second wireless communication device, means for determining from the first RF BW a first shared BW for a first channel occupancy time (COT) associated with the second wireless communication device, and means for transmitting a second transmission to the second wireless communication device on the first shared BW during the first COT. In some examples, the first RF BW is defined within an unlicensed RF spectrum and the first shared BW includes the first RF BW.

In some examples, an article of manufacture for use by a wireless communication device includes a non-transitory computer-readable medium having stored therein instructions executable by one or more processors of the wireless communication device to receive a first transmission on a first radio frequency (RF) bandwidth (BW) from a second wireless communication device, determine from the first RF BW a first shared BW for a first channel occupancy time (COT) associated with the second wireless communication device, and transmit a second transmission to the second wireless communication device on the first shared BW during the first COT. In some examples, the first RF BW is defined within an unlicensed RF spectrum and the first shared BW includes the first RF BW.

In some examples, a method for wireless communication at a wireless communication device is disclosed. The method may include receiving a first transmission on a first radio frequency (RF) bandwidth (BW) from a second wireless communication device, decoding the first transmission to obtain an indication, determining from the indication a first shared BW for a first channel occupancy time (COT) associated with the second wireless communication device, and transmitting a second transmission to the second wireless communication device on the first shared BW during the first COT. In some examples, the first RF BW is defined within an unlicensed RF spectrum.

In some examples, a wireless communication device may include a transceiver, a memory, and a processor coupled to the transceiver and the memory. The processor and the memory may be configured to receive a first transmission on a first radio frequency (RF) bandwidth (BW) from a second wireless communication device via the transceiver, decode the first transmission to obtain an indication, determining from the indication a first shared BW for a first channel occupancy time (COT) associated with the second wireless communication device, and transmit a second transmission to the second wireless communication device on the first shared BW during the first COT via the transceiver. In some examples, the first RF BW is defined within an unlicensed RF spectrum.

In some examples, a wireless communication device may include means for receiving a first transmission on a first radio frequency (RF) bandwidth (BW) from a second wireless communication device, means for decoding the first transmission to obtain an indication, determining from the indication a first shared BW for a first channel occupancy time (COT) associated with the second wireless communication device, and means for transmitting a second transmission to the second wireless communication device on the first shared BW during the first COT. In some examples, the first RF BW is defined within an unlicensed RF spectrum.

In some examples, an article of manufacture for use by a wireless communication device includes a non-transitory computer-readable medium having stored therein instructions executable by one or more processors of the wireless communication device to receive a first transmission on a first radio frequency (RF) bandwidth (BW) from a second wireless communication device, decode the first transmission to obtain an indication, determining from the indication a first shared BW for a first channel occupancy time (COT) associated with the second wireless communication device, and transmit a second transmission to the second wireless communication device on the first shared BW during the first COT. In some examples, the first RF BW is defined within an unlicensed RF spectrum.

In some examples, a method for wireless communication at a wireless communication device is disclosed. The method may include conducting a clear channel assessment (CCA) on a first radio frequency (RF) bandwidth (BW), selecting a second RF BW that is a proper subset of the first RF BW, selecting a first shared BW for a first channel occupancy time (COT) associated with the CCA, transmitting a first transmission on the second RF BW to a second wireless communication device, and receiving a second transmission from the second wireless communication device on the first shared BW during the first COT. In some examples, the first RF BW is defined within an unlicensed RF spectrum. In some examples, the first shared BW is based on the first RF BW and includes the second RF BW.

In some examples, a wireless communication device may include a transceiver, a memory, and a processor coupled to the transceiver and the memory. The processor and the memory may be configured to conduct a clear channel assessment (CCA) on a first radio frequency (RF) bandwidth (BW), select a second RF BW that is a proper subset of the first RF BW, select a first shared BW for a first channel occupancy time (COT) associated with the CCA, transmit a first transmission on the second RF BW to a second wireless communication device via the transceiver, and receive a second transmission from the second wireless communication device on the first shared BW during the first COT via the transceiver. In some examples, the first RF BW is defined within an unlicensed RF spectrum. In some examples, the first shared BW is based on the first RF BW and includes the second RF BW.

In some examples, a wireless communication device may include means for conducting a clear channel assessment (CCA) on a first radio frequency (RF) bandwidth (BW), means for selecting a second RF BW that is a proper subset of the first RF BW, means for selecting a first shared BW for a first channel occupancy time (COT) associated with the CCA, means for transmitting a first transmission on the second RF BW to a second wireless communication device, and means for receiving a second transmission from the second wireless communication device on the first shared BW during the first COT. In some examples, the first RF BW is defined within an unlicensed RF spectrum. In some examples, the first shared BW is based on the first RF BW and includes the second RF BW.

In some examples, an article of manufacture for use by a wireless communication device includes a non-transitory computer-readable medium having stored therein instructions executable by one or more processors of the wireless communication device to conduct a clear channel assessment (CCA) on a first radio frequency (RF) bandwidth (BW), select a second RF BW that is a proper subset of the first RF BW, select a first shared BW for a first channel occupancy time (COT) associated with the CCA, transmit a first transmission on the second RF BW to a second wireless communication device, and receive a second transmission from the second wireless communication device on the first shared BW during the first COT. In some examples, the first RF BW is defined within an unlicensed RF spectrum. In some examples, the first shared BW is based on the first RF BW and includes the second RF BW.

In some examples, a method for wireless communication at a user equipment is disclosed. The method may include receiving a first indication of a resource block set configuration from a base station, receiving a second indication from the base station to activate the resource block set configuration after the receiving the first indication, and communicating with the base station via at least one resource block indicated by the resource block set configuration after the receiving the second indication.

In some examples, a user equipment may include a transceiver, a memory, and a processor coupled to the transceiver and the memory. The processor and the memory may be configured to receive a first indication of a resource block set configuration from a base station via the transceiver, receive a second indication from the base station via the transceiver to activate the resource block set configuration after the receiving the first indication, and communicate, via the transceiver, with the base station via at least one resource block indicated by the resource block set configuration after the reception of the second indication.

In some examples, a user equipment may include means for receiving a first indication of a resource block set configuration from a base station, means for receiving a second indication from the base station to activate the resource block set configuration after the receiving the first indication, and means for communicating with the base station via at least one resource block indicated by the resource block set configuration after the receiving the second indication.

In some examples, an article of manufacture for use by a user equipment includes a non-transitory computer-readable medium having stored therein instructions executable by one or more processors of the user equipment to receive a first indication of a resource block set configuration from a base station, receive a second indication from the base station to activate the resource block set configuration after the receiving the first indication, and communicate with the base station via at least one resource block indicated by the resource block set configuration after the reception of the second indication.

In some examples, a method for wireless communication at a base station is disclosed. The method may include transmitting a first indication of a resource block set configuration to a user equipment, transmitting a second indication to the user equipment to activate the resource block set configuration after the transmitting the first indication, and communicating with the user equipment via at least one resource block indicated by the resource block set configuration after the transmitting the second indication.

In some examples, a base station may include a transceiver, a memory, and a processor coupled to the transceiver and the memory. The processor and the memory may be configured to transmit a first indication of a resource block set configuration to a user equipment via the transceiver, transmit a second indication to the user equipment via the transceiver to activate the resource block set configuration after the transmission of the first indication, and communicate, via the transceiver, with the user equipment via at least one resource block indicated by the resource block set configuration after the transmission of the second indication.

In some examples, a base station may include means for transmitting a first indication of a resource block set configuration to a user equipment, means for transmitting a second indication to the user equipment to activate the resource block set configuration after the transmitting the first indication, and means for communicating with the user equipment via at least one resource block indicated by the resource block set configuration after the transmitting the second indication.

In some examples, an article of manufacture for use by a base station includes a non-transitory computer-readable medium having stored therein instructions executable by one or more processors of the base station to transmit a first indication of a resource block set configuration to a user equipment, transmit a second indication to the user equipment to activate the resource block set configuration after the transmission of the first indication, and communicate with the user equipment via at least one resource block indicated by the resource block set configuration after the transmission of the second indication.

The following provides an overview of several aspects of the present disclosure.

Aspect 1: A method for wireless communication at a wireless communication device, the method comprising: receiving a first transmission on a first radio frequency (RF) bandwidth (BW) from a second wireless communication device, the first RF BW being defined within an unlicensed RF spectrum; and transmitting a second transmission to the second wireless communication device on a first shared BW during a channel occupancy time (COT) associated with the second wireless communication device, the first shared BW including the first RF BW.

Aspect 2: The method of aspect 1, further comprising: determining the first shared BW from the first RF BW.

Aspect 3: The method of any of aspects 1 through 2, further comprising: setting the first shared BW equal to the first RF BW.

Aspect 4: The method of any of aspects 1 through 2, further comprising: identifying at least one resource block set from a resource block set configuration based on the first RF BW.

Aspect 5: The method of aspect 4, wherein: the resource block set configuration indicates that the at least one resource block set includes at least a portion of the first RF BW; and the method further comprises setting the first shared BW equal to a BW of the at least one resource block set.

Aspect 6: The method of any of aspects 4 through 5, further comprising: receiving the resource block set configuration from the second wireless communication device.

Aspect 7: The method of aspect 6, further comprising: receiving an indication from the second wireless communication device to activate the resource block set configuration.

Aspect 8: The method of aspect 7, wherein: the receiving the resource block set configuration comprises receiving a radio resource control (RRC) message that includes the resource block set configuration; and the receiving the indication comprises receiving downlink control information (DCI) that includes the first indication.

Aspect 9: The method of any of aspects 1, 2, 4, and 6 through 8, further comprising: identifying the first shared BW based on the first RF BW and a frequency resource mapping.

Aspect 10: The method of aspect 9, wherein: the first RF BW comprises a first set of resource blocks; and the frequency resource mapping indicates a second set of resource blocks that is mapped to the first set of resource blocks.

Aspect 11: The method of any of aspects 9 through 10, wherein the frequency resource mapping indicates an active downlink bandwidth part including the first RF BW.

Aspect 12: The method of any of aspects 9 through 10, wherein the frequency resource mapping indicates an active uplink bandwidth part including the first RF BW.

Aspect 13: The method of any of aspects 9 through 12, wherein the frequency resource mapping indicates at least one resource block set that is mapped to the first RF BW.

Aspect 14: The method of any of aspects 9 through 13, wherein: the frequency resource mapping indicates a CCA BW that is mapped to the first RF BW; and the method further comprises setting the first shared BW equal to the CCA BW.

Aspect 15: The method of any of aspects 9 through 14, further comprising: receiving the frequency resource mapping from the second wireless communication device.

Aspect 16: The method of any of aspects 9 through 14, further comprising: receiving the frequency resource mapping from the second wireless communication device via a radio resource control (RRC) configuration for the first transmission.

Aspect 17: The method of any of aspects 1 through 16, further comprising: receiving an indication that the COT has been initiated; and determining the first shared BW based on the first RF BW and the indication that the COT has been initiated.

Aspect 18: A wireless communication device comprising: a transceiver configured to communicate with a radio access network, a memory, and a processor communicatively coupled to the transceiver and the memory, wherein the processor and the memory are configured to perform any one of aspects 1 through 17.

Aspect 19: An apparatus configured for wireless communication comprising at least one means for performing any one of aspects 1 through 17.

Aspect 20: A non-transitory computer-readable medium storing computer-executable code, comprising code for causing an apparatus to perform any one of aspects 1 through 17.

Aspect 21: A method for wireless communication at a wireless communication device, the method comprising: conducting a clear channel assessment (CCA) on a first radio frequency (RF) bandwidth (BW), wherein the first RF BW is defined within an unlicensed RF spectrum; transmitting a first transmission on a second RF BW to a second wireless communication device, the second RF BW being a proper subset of the first RF BW; and receiving a second transmission from the second wireless communication device on a first shared BW during a channel occupancy time (COT) associated with the CCA, the first shared BW being based on the first RF BW and including the second RF BW.

Aspect 22: The method of aspect 21, further comprising: defining the second RF BW as a proper subset of the first RF BW; and defining the first shared BW based on the first RF BW and to include the second RF BW.

Aspect 23: The method of any of aspects 21 through 22, further comprising: transmitting an indication that the COT has been initiated.

Aspect 24: The method of any of aspects 21 through 23, further comprising: transmitting a resource block set configuration to the second wireless communication device, the resource block set configuration indicating at least one resource block set that includes at least a portion of the second RF BW.

Aspect 25: The method of aspect 24, further comprising: transmitting an indication to the second wireless communication device to activate the resource block set configuration.

Aspect 26: The method of aspect 25, wherein: the transmitting the resource block set configuration comprises transmitting a radio resource control (RRC) message that includes the resource block set configuration; and the transmitting the indication comprises transmitting downlink control information (DCI) that includes the indication.

Aspect 27: The method of any of aspects 21 through 26, further comprising: transmitting a frequency resource mapping to the second wireless communication device.

Aspect 28: The method of aspect 27, wherein: the second RF BW comprises a first set of resource blocks; and the frequency resource mapping indicates a second set of resource blocks that is mapped to the first set of resource blocks.

Aspect 29: The method of any of aspects 27 through 28, the frequency resource mapping indicates an active downlink bandwidth part including the first RF BW; or the frequency resource mapping indicates an active uplink bandwidth part including the first RF BW.

Aspect 30: The method of any of aspects 27 through 29, wherein the frequency resource mapping indicates at least one resource block set that is mapped to the second RF BW.

Aspect 31: The method of any of aspects 27 through 30, wherein the frequency resource mapping indicates a CCA BW that is mapped to the second RF BW.

Aspect 32: A wireless communication device comprising: a transceiver configured to communicate with a radio access network, a memory, and a processor communicatively coupled to the transceiver and the memory, wherein the processor and the memory are configured to perform any one of aspects 21 through 31.

Aspect 33: An apparatus configured for wireless communication comprising at least one means for performing any one of aspects 21 through 31.

Aspect 34: A non-transitory computer-readable medium storing computer-executable code, comprising code for causing an apparatus to perform any one of aspects 21 through 31.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-25 may be rearranged and/or combined into a single component, step, feature or function or embodied in several components, steps, or functions.

Additional elements, components, steps, and/or functions may also be added without departing from novel features disclosed herein. The apparatus, devices, and/or components illustrated in FIGS. 1, 2, 13, 14, 21, 23, and 25 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first wireless communication device, comprising:
one or more memories that store processor-executable code; and
one or more processors configured to execute the processor-executable code and cause the first wireless communication device to:
detect a channel occupancy time (COT) initiating transmission on an unlicensed radio frequency (RF) spectrum from a second wireless communication device;
detect an RF bandwidth (BW) of the COT initiating transmission, the detection of the RF BW comprising a detection of a transmission bandwidth occupation of the COT initiating transmission from an initial resource block to a final resource block within a listen-before-talk (LBT) bandwidth; and
transmit a second transmission to the second wireless communication device on a first shared BW during the COT, wherein a width of the first shared BW is set based on a width of the detected RF BW, and wherein the first shared BW includes the detected RF BW.

2. The first wireless communication device of claim 1, wherein the one or more processors are further configured to execute the processor-executable code to cause the first wireless communication device to:
set the first shared BW equal to the detected RF BW.

3. The first wireless communication device of claim 1, wherein the one or more processors are further configured to execute the processor-executable code to cause the first wireless communication device to:
identify at least one resource block set from a resource block set configuration based on the detected RF BW.

4. The first wireless communication device of claim 3, wherein:
the resource block set configuration indicates that the at least one resource block set includes at least a portion of the detected RF BW; and
the one or more processors are further configured to execute the processor-executable code to cause the first wireless communication device to set the first shared BW equal to a BW of the at least one resource block set.

5. The first wireless communication device of claim 3, wherein the one or more processors are further configured to execute the processor-executable code to cause the first wireless communication device to:
receive the resource block set configuration from the second wireless communication device.

6. The first wireless communication device of claim 5, wherein the one or more processors are further configured to execute the processor-executable code to cause the first wireless communication device to:
receive an indication from the second wireless communication device to activate the resource block set configuration.

7. The first wireless communication device of claim 6, wherein the one or more processors are further configured to execute the processor-executable code to cause the first wireless communication device to:
receive a radio resource control (RRC) message that includes the resource block set configuration; and
receive downlink control information (DCI) that includes the indication.

8. The first wireless communication device of claim 1, wherein the one or more processors are further configured to execute the processor-executable code to cause the first wireless communication device to:
identify the first shared BW based on the detected RF BW and a frequency resource mapping.

9. The first wireless communication device of claim 8, wherein:
the detected RF BW comprises a first set of resource blocks; and
the frequency resource mapping indicates a second set of resource blocks that is mapped to the first set of resource blocks.

10. The first wireless communication device of claim 8, wherein the frequency resource mapping indicates an active downlink bandwidth part including the detected RF BW.

11. The first wireless communication device of claim 8, wherein the frequency resource mapping indicates an active uplink bandwidth part including the detected RF BW.

12. The first wireless communication device of claim 8, wherein the frequency resource mapping indicates at least one resource block set that is mapped to the detected RF BW.

13. The first wireless communication device of claim 8, wherein:
the frequency resource mapping indicates a CCA BW that is mapped to the detected RF BW; and
the one or more processors are further configured to execute the processor-executable code to cause the first wireless communication device to set the first shared BW equal to the CCA BW.

14. The first wireless communication device of claim 8, wherein the one or more processors are further configured to execute the processor-executable code to cause the first wireless communication device to:

receive the frequency resource mapping from the second wireless communication device.

15. The first wireless communication device of claim 8, wherein the one or more processors are further configured to execute the processor-executable code to cause the first wireless communication device to:

receive the frequency resource mapping from the second wireless communication device via a radio resource control (RRC) configuration for the COT initiating transmission.

16. The first wireless communication device of claim 1, wherein the width of the first shared BW is wider than the width of the detected RF BW.

17. The first wireless communication device of claim 1, wherein the width of the first shared BW is set in the absence of an indication of the width of the first shared BW from the second wireless communication device.

18. The first wireless communication device of claim 1, wherein the COT initiating transmission includes control information and data.

19. A method for wireless communication at a first wireless communication device, the method comprising:

detecting a channel occupancy time (COT) initiating transmission on an unlicensed radio frequency (RF) spectrum from a second wireless communication device;

detecting an RF bandwidth (BW) of the COT initiating transmission, the detecting the RF BW comprising detecting a transmission bandwidth occupation of the COT initiating transmission from an initial resource block to a final resource block within a listen-before-talk (LBT) bandwidth; and transmitting a second transmission to the second wireless communication device on a first shared BW during the COT, wherein a width of the first shared BW is set based on a width of the detected RF BW, and wherein the first shared BW includes the detected RF BW.

20. The method of claim 19, further comprising:

setting the first shared BW equal to the detected RF BW.

21. The method of claim 19, further comprising:

identifying at least one resource block set from a resource block set configuration based on the detected RF BW.

22. The method of claim 21, wherein:

the resource block set configuration indicates that the at least one resource block set includes at least a portion of the detected RF BW; and the method further comprises setting the first shared BW equal to a BW of the at least one resource block set.

23. The method of claim 21, further comprising:

receiving the resource block set configuration from the second wireless communication device.

24. The method of claim 23, further comprising:

receiving an indication from the second wireless communication device to activate the resource block set configuration.

25. The method of claim 24, wherein:

the receiving the resource block set configuration comprises receiving a radio resource control (RRC) message that includes the resource block set configuration; and the receiving the indication comprises receiving downlink control information (DCI) that includes the indication.

26. The method of claim 19, further comprising:

identifying the first shared BW based on the detected RF BW and a frequency resource mapping.

27. A first wireless communication device, comprising:

means for detecting a channel occupancy time (COT) initiating transmission on an unlicensed radio frequency (RF) spectrum from a second wireless communication device;

means for detecting an RF bandwidth (BW) of the COT initiating transmission, the detecting the RF BW comprising detecting a transmission bandwidth occupation of the COT initiating transmission from an initial resource block to a final resource block within a listen-before-talk (LBT) bandwidth; and means for transmitting a second transmission to the second wireless communication device on a first shared BW during the COT, wherein a width of the first shared BW is set based on a width of the detected RF BW, and wherein the first shared BW includes the detected RF BW.

\* \* \* \* \*